US012664861B2

(12) United States Patent
Shepherd et al.

(10) Patent No.: US 12,664,861 B2
(45) Date of Patent: Jun. 23, 2026

(54) PERSONAL TOURNAMENTS

(71) Applicant: IGT, Las Vegas, NV (US)

(72) Inventors: Jeffery Shepherd, Reno, NV (US); Kevin Higgins, Reno, NV (US); Donald Dusich, Reno, NV (US)

(73) Assignee: IGT, Las Vegas, NV (US)

(*) Notice: Subject to any disclaimer, the term of this patent is extended or adjusted under 35 U.S.C. 154(b) by 220 days.

(21) Appl. No.: 18/539,784

(22) Filed: Dec. 14, 2023

(65) Prior Publication Data

US 2025/0201081 A1 Jun. 19, 2025

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.
CPC ...... *G07F 17/3276* (2013.01); *G07F 17/3239* (2013.01); *G07F 17/3244* (2013.01)

(58) Field of Classification Search
CPC ... G07F 17/32; G07F 17/3214; G07F 17/3222
USPC .............................. 463/1, 20, 22, 25, 30, 39
See application file for complete search history.

(56) References Cited

U.S. PATENT DOCUMENTS

| | | | | |
|---|---|---|---|---|
| 6,287,202 | B1 | 9/2001 | Pascal et al. | |
| 6,652,378 | B2 | 11/2003 | Cannon et al. | |
| 7,033,270 | B2 | 4/2006 | Baerlocher et al. | |
| 7,121,943 | B2 | 10/2006 | Webb et al. | |
| 7,582,011 | B2 | 9/2009 | Maling | |
| 7,690,996 | B2 | 4/2010 | Iddings et al. | |
| 7,798,901 | B2 | 9/2010 | Nguyen et al. | |
| 8,317,620 | B2 | 11/2012 | Kelly et al. | |
| 8,419,520 | B2 | 4/2013 | Johnson | |
| 8,419,546 | B2 | 4/2013 | Decasa et al. | |
| 8,622,793 | B2 | 1/2014 | Ford | |
| 8,702,520 | B2 | 4/2014 | Seelig et al. | |
| 10,235,841 | B2 | 3/2019 | Nguyen et al. | |
| 10,373,442 | B2 | 8/2019 | Schlottmann et al. | |
| 11,830,326 | B2 | 11/2023 | Marks et al. | |
| 2002/0039923 | A1* | 4/2002 | Cannon | G07F 17/3244 463/42 |
| 2002/0183105 | A1 | 12/2002 | Cannon et al. | |
| 2003/0060264 | A1 | 3/2003 | Chilton et al. | |
| 2004/0266533 | A1 | 12/2004 | Gentles et al. | |

(Continued)

OTHER PUBLICATIONS

"IGT Tournament Manager—Video Poker and Slot Tournaments Made Easy", Copyright 2013 IGT (1 page).

*Primary Examiner* — Adetokunbo O Torimiro
(74) *Attorney, Agent, or Firm* — Neal, Gerber & Eisenberg LLP

(57) ABSTRACT

Gaming systems and methods that provide a display of a plurality of different personal tournaments, enable a player to select one of the personal tournaments, cause a display and enable the player to play the selected personal tournament, determine if the player achieves or exceeds a standard for the play of the personal tournament, determine any award for the play of the personal tournament based on whether the player achieves or exceeds the standard for the play of the personal tournament, cause a display of any such determined award, and cause any such determined award to be provided to the player.

19 Claims, 15 Drawing Sheets

(56) References Cited

U.S. PATENT DOCUMENTS

| | | | | |
|---|---|---|---|---|
| 2005/0130728 | A1* | 6/2005 | Nguyen | G07F 17/3218 463/16 |
| 2006/0157934 | A1 | 7/2006 | Yoseloff et al. | |
| 2009/0131175 | A1 | 5/2009 | Kelly et al. | |
| 2009/0280910 | A1* | 11/2009 | Gagner | G07F 17/3209 463/30 |
| 2010/0130275 | A1 | 5/2010 | Mace et al. | |
| 2011/0077071 | A1 | 3/2011 | Decasa et al. | |
| 2012/0302310 | A1 | 11/2012 | Kelly et al. | |
| 2013/0296036 | A1 | 11/2013 | Scott | |
| 2014/0309023 | A1 | 10/2014 | Suyat et al. | |
| 2016/0314660 | A1 | 10/2016 | Nguyen et al. | |
| 2017/0076553 | A1 | 3/2017 | Washington et al. | |
| 2018/0322723 | A1* | 11/2018 | LeMay | G07F 17/3223 |
| 2021/0183203 | A1 | 6/2021 | Wang et al. | |
| 2023/0166193 | A1* | 6/2023 | Greige | A63F 13/75 463/23 |

* cited by examiner

PERSONAL TOURNAMENTS

BACKGROUND

The present disclosure relates to personal tournaments in a gaming environment.

Gaming systems may provide player tournaments. Gaming systems may provide one or more tournament awards to one or more players. Gaming systems may provide timed tournaments for players.

BRIEF SUMMARY

Various embodiments of the present disclosure provide a gaming system including a personal tournament controller, personal tournament controller including a processor and a memory device storing a plurality of instructions, that when executed by the processor, cause the processor to: cause a display, by a display device of an electronic gaming machine, of an indication of personal tournament, wherein the personal tournament includes a standard, and wherein the personal tournament is not against any other competitors, players, or electronic gaming machines; cause a display, by the display device of the electronic gaming machine, of an indication of the standard of the personal tournament; cause a display, by the display device of the electronic gaming machine, of a play of the personal tournament including a plurality of plays of a tournament game of the personal tournament; cause a display, by the display device of the electronic gaming machine, of an indication that the standard for the play of the personal tournament is achieved or exceeded; and cause a display, by the display device of the electronic gaming machine, of an indication of an amount based on the standard for the play of the personal tournament being achieved or exceeded.

Various other embodiments of the present disclosure provide a gaming system including a personal tournament controller including a processor and a memory device storing a plurality of instructions, that when executed by the processor, cause the processor to: cause a display, by a display device of an electronic gaming machine, of indications of a plurality of different personal tournaments, wherein each personal tournament include a standard, and wherein each personal tournament is not against any other competitors, players, or electronic gaming machines; cause a display, by the display device of the electronic gaming machine, of an indication of a player selected one of the personal tournaments and the standard of the selected personal tournament; cause a display, by the display device of the electronic gaming machine, of a play of the selected personal tournament including a plurality of plays of a tournament game of the selected personal tournament; cause a display, by the display device of the electronic gaming machine, of an indication of the standard for the play of the selected personal tournament being achieved or exceeded; and cause a display, by the display device of the electronic gaming machine, of an indication of an amount for the standard for the play of the selected personal tournament being achieved or exceeded.

Various other embodiments of the present disclosure provide a gaming system including a personal tournament controller including a processor and a memory device storing a plurality of instructions, that when executed by the processor, cause the processor to: cause a display, by a display device of an electronic gaming machine, of indications of a plurality of different personal tournaments, wherein each personal tournament includes a different type of standard, and wherein each personal tournament is not against any other competitors, players, or electronic gaming machines; cause a display, by the display device of the electronic gaming machine, of an indication of a player selected one of the personal tournaments and the standard of the selected personal tournament; cause a display, by the display device of the electronic gaming machine, of a play of the selected personal tournament including a plurality of plays of a tournament game of the selected personal tournament; cause a display, by the display device of the electronic gaming machine, of an indication of the standard for the play of the selected personal tournament being achieved or exceeded; and cause a display, by the display device of the electronic gaming machine, of an indication of an amount for the standard for the play of the selected personal tournament being achieved or exceeded.

Additional features are described in, and will be apparent from, the following Detailed Description and the figures.

DETAILED DESCRIPTION

Personal Tournaments

Figure 1:
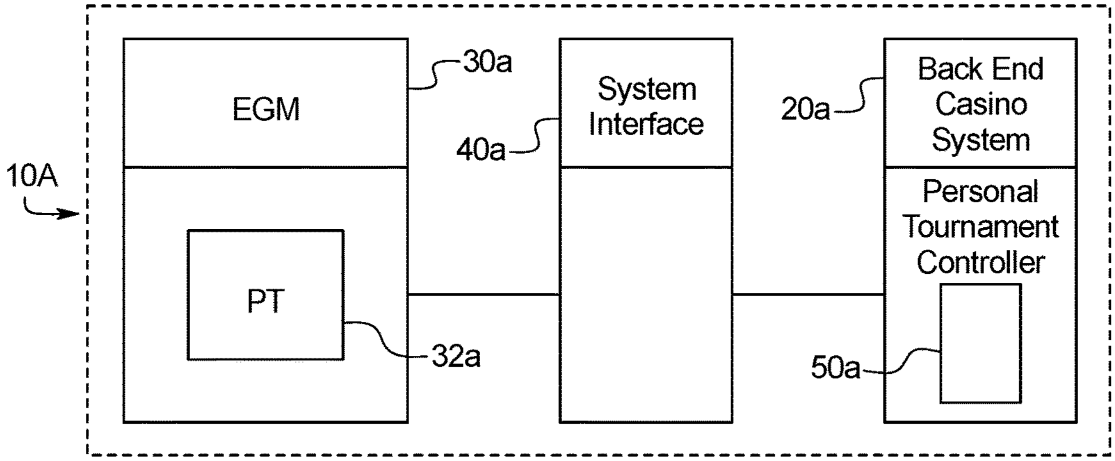
FIG. 1 is a schematic diagram of a personal tournament gaming system of one example embodiment of the present disclosure.

The present disclosure relates to personal tournaments in gaming environments, and to gaming systems and methods of operating gaming systems that provide personal tournaments. The present disclosure also relates to tournament gaming systems and methods of operating tournament gaming systems for a casino gaming environment.

The following brief background regarding tournaments in casino gaming environments is provided for a better understanding of the present disclosure.

One known type of tournament includes a bank of gaming machines at which players simultaneously play (the same game) for a predetermined period of time. At the end of the period of time and thus the end of the play of the tournament, the player that has won the most credits (or other units) is the winner of the play of the tournament, and is provided with an award. In such tournaments, the player play simultaneously at the gaming machines and are competing against each other.

Another known type of tournament includes gaming machines that provide the same games that players play independently for a predetermined period of time. In these tournaments, each player can select exactly when to play the tournament game during an overall period for the play of the tournament. In such tournaments, the players do not need to play simultaneously during the overall period but are still competing against each other. At the end of the overall period for the play of the tournament, the player that has won the most credits (or other units) is the winner of the play of the tournament and is provided with an award.

Various embodiments of the present disclosure are directed to gaming systems and methods that provide plays of personal tournaments where each player is not competing against any of the other competitors or players (such as competitors or players at other gaming systems or electronic gaming machines), but is rather competing in the respective play of the personal tournament against one or more standards for that play of the personal tournament. Various advantage of this personal tournament configuration (where players do not compete against each other) are that: (1) the play of personal tournament does have to not require a set overall period for the player to complete the play of the personal tournament; (2) the play of the personal tournament does not require a set quantity (such as a minimum quantity) of players for the play of the personal tournament; (3) the play of the personal tournament does not require certain types of set conditions for the play of the personal tournament; (4) the play of the personal tournament does not make players adverse to each other for the play of the personal tournament; (5) the play of the personal tournament can include and better enables players to root for each other instead of against each other for the play of the personal tournament; (6) the play of the personal tournament provides a different style of game with a different scoring system and outcome delivery than the various gaming machine; (7) the play of the personal tournament provides a different type of volatility that a player may find exciting in that the player can see progress toward the standard they are trying to achieve.

In various embodiments, the one or more standards for a play of a personal tournament that includes one or more game plays of one or more tournament games can be any suitable one or more standards such as but not limited to: (1) a predetermined score achieved; (2) a predetermined quantity of credits (or other units) won; (3) a gross amount won; (4) a net amount won; (5) a quantity of winning tournament game plays (e.g., with any winning symbols or winning symbol combinations); (6) a quantity of winning tournament game plays with one or more predetermined outcomes (e.g., with pre-determined winning symbols or winning symbol combinations); (7) a combination of winning tournament game plays with two or more predetermined outcomes (e.g., with two or more different pre-determined winning symbols or winning symbol combinations); (8) an accumulation of a predetermined quantity of one or more symbols; and (9) using a set number (such as all) credits within a set time period.

In various embodiments, the different personal tournaments can all have a same entry payment amount or requirement.

In various embodiments, two or more of the different personal tournaments can have different entry payment amounts or requirements.

In various embodiments, the entry payment amount for a play of personal tournament can depend on the respective standard(s) for that personal tournament. For example, a first personal tournament with a first standard that is more likely to occur can have a lower required entry payment than a second personal tournament with a different second standard that is less likely to occur. The combination of the likelihood of achieving the standard, coupled with the award amount(s) for achieving the standard can be used in determining entry payment amount. For example, for an easy to achieve standard with a large award amount can require that the entry payment be larger than that for a hard to achieve standard with a smaller reward.

In various embodiments, a play of a personal tournament can also include one or more interim standards. In various embodiments, the one or more interim standards can be part of the standard for the play of the personal tournament, based directly on that standard, based indirectly on that standard, or completely separate from and independent from that standard.

In various embodiments, each interim standard is a portion of the standard for the play of the personal tournament. For example, if the standard is 25 game plays each with a winning outcome, the interim standard can be 15 game plays each with a winning outcome.

In various embodiments, each interim standard is a portion of another standard that is related to the standard for the play of the personal tournament but not part of that standard. For example, if the standard is 25 games plays each with a winning outcome, the interim standard can be 500 credits won during the first 15 game plays.

In various embodiments of the present disclosure, the standard for a play of the personal tournament can be multiple standards such as combinations of individual standards.

In various embodiments of the present disclosure, the standard for a play of a personal tournament is predetermined.

In various embodiments of the present disclosure, the standard for a play of a personal tournament is randomly determined from a plurality of different standards.

In various embodiments of the present disclosure, the standard for a play of a personal tournament is player selectable from a plurality of different standards. In various such embodiments of the present disclosure, the award amounts associated with such personal tournament and such standards are different and thus, the player can select which award amounts the player wants to seek based on which personal tournament the player selects (and which standard(s) the player wants to try to achieve). For example, the gaming system can display a list of different available personal tournaments for the player, the standard(s) for each respective personal tournament, any interim standard(s) for each respective personal tournament, the entry payment required for each respective personal tournament, and the award amount(s) available to be won from each respective personal tournament.

In various embodiments of the present disclosure, the difficulty of the standard for a play of a personal tournament is player selectable from a plurality of different standards of different difficulty levels.

In various embodiments, when the player achieves or exceeds the standard for a play of a personal tournament, the gaming system provides the player an award amount for achieving or exceeding the standard for the play of the personal tournament.

In various embodiments, if the player achieves or exceeds an interim standard during a play of the personal tournament, the gaming system can provide the player an award amount or other benefit. In various embodiments, the other benefit is a further advancement toward achieving the standard for that play of the personal tournament. An example of a benefit for achieving an interim standard would be for the player benefit to enhance the current status in the play of the personal tournament in a suitable fashion (such as credits toward the personal tournament standard). An example of an award for achieving an interim standard would be an award totally external to the personal tournament (such as a free meal).

In various embodiments, the gaming systems and methods provide one or more different personal tournaments with such standards that can be selected by a player of an electronic gaming machine ("EGM") of the gaming system. In various such embodiments, the gaming system enables the player at the EGM of the gaming system to selectively participate in one or more of the available different personal tournaments via that EGM. Various embodiments of the gaming system thus enable an EGM that is not a dedicated tournament EGM (and/or not an EGM that can be switched to a dedicated tournament mode) to facilitate player selected personal tournament play.

In various embodiments, the gaming systems and methods also include a back-end casino system configured to facilitate the one or more different personal tournaments with such standards where the personal tournament can be selected by a player of an EGM of the gaming system. The back-end casino system can include one or more central servers.

In various embodiments, the back-end casino system of the gaming system is configured to cause personal tournament data to be communicated to the EGM to enable display of indications of each of the different personal tournaments that the player at that EGM can participate in. In various embodiments, back-end casino system of the gaming system is configured to receive data associated with the player of the EGM requesting to participate in one of the different personal tournaments.

In various embodiments, the gaming system is configured to cause the EGM to display the indications of available personal tournaments (and related information such as mentioned above) via a suitable display device of the EGM. In various embodiments, the gaming system is configured to cause the EGM to display the indications of available personal tournaments thereof in a service window displayed by that EGM.

In various embodiments, the back-end casino system of the gaming system is configured to cause the EGM to display the plays of the personal tournament via a suitable display device of the EGM. In various embodiments, the gaming system is configured to cause the EGM to display the plays of the personal tournament in a service window displayed by that EGM.

In various embodiments of the present disclosure, the personal tournament is implemented and provided via a personal tournament controller ("PTC"). The PTC is the primary component that controls one or more of: (1) the available personal tournaments; (2) the payment of the entry payment for each play of the personal tournament (if required) and verification thereof; (3) the display of the play of the personal tournament; and (4) the award amount(s) provided based on the play of the personal tournament. The present disclosure contemplates various different embodiments for implementing the PTC in terms of placement and configuration of the PTC such as further described below.

In various embodiments, the PTC is located in a single device or different parts of the PTC are located in multiple devices. In various embodiments, part or all of the PTC is located within the back-end casino system. In various embodiments, part or all of the PTC is located within the EGM. In various embodiments, part or all of the PTC is located within a suitable interface between the EGM and the back-end casino system such as on a slot machine interface board ("SMIB") that facilitates communication between an EGM and a back-end casino system.

FIG. 1 shows a first example embodiment of the present disclosure. In this example embodiment, the gaming system 10A includes one or more back-end casino systems such as back-end casino system 20*a*, one or more EGMs such as EGM 30*a*, and one or SMIBs such as SMIB 40*a*. Each SMIB can be within the cabinet of the respective EGM or outside of the cabinet of the respective EGM. The back-end casino systems each includes a PTC such as the PTC 50*a* in the back-end casino system 20*a*. The PTC 50*a* controls the functions of each personal tournament on the EGM 30*a* and communicates all data for each personal tournament to the EGM 30*a* via the SMIB 40*a*. In this example, the EGM 30*a* displays a personal tournament interface 32*a* that displays the play of the personal tournament.

Figure 2:
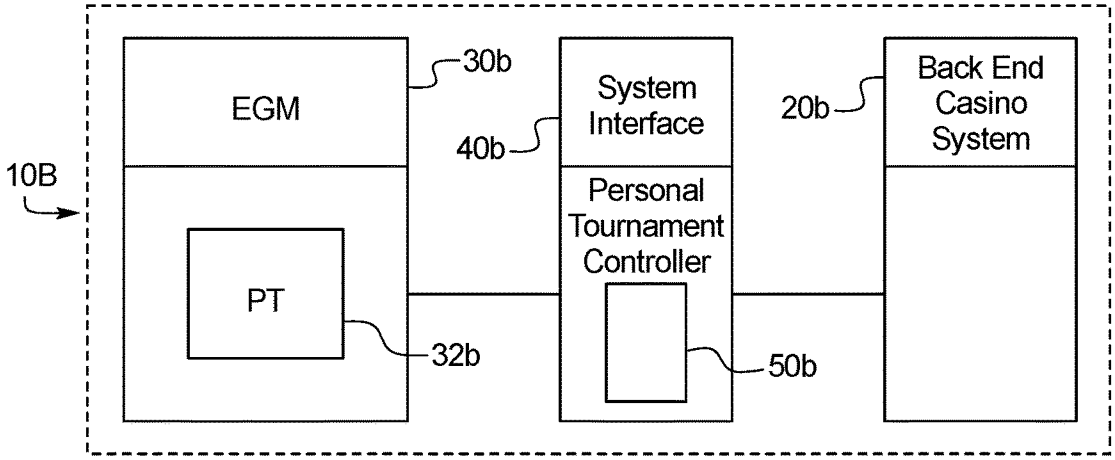
FIG. 2 is a schematic diagram of a personal tournament gaming system of another example embodiment of the present disclosure.

FIG. 2 shows a second example embodiment of the present disclosure. In this example embodiment, the gaming system 10*b* includes one or more back-end casino systems such as back-end casino system 20*b*, one or more EGMs such as EGM 30*b*, and one or SMIBs such as SMIB 40*b*. Each SMIB can be within of the cabinet of the respective EGM or outside of the cabinet of the respective EGM. The SMIBs each includes a PTC such as the PTC 50*b* in SMIB 40*b*. The PTC 50*b* controls each personal tournament on the EGM 30*b* and communicates all data for each personal tournament to the EGM 30*b* via the SMIB 40*b*. In this example, the EGM 30*b* displays a personal tournament interface 32*b* that displays the play of the personal tournament.

Figure 3:
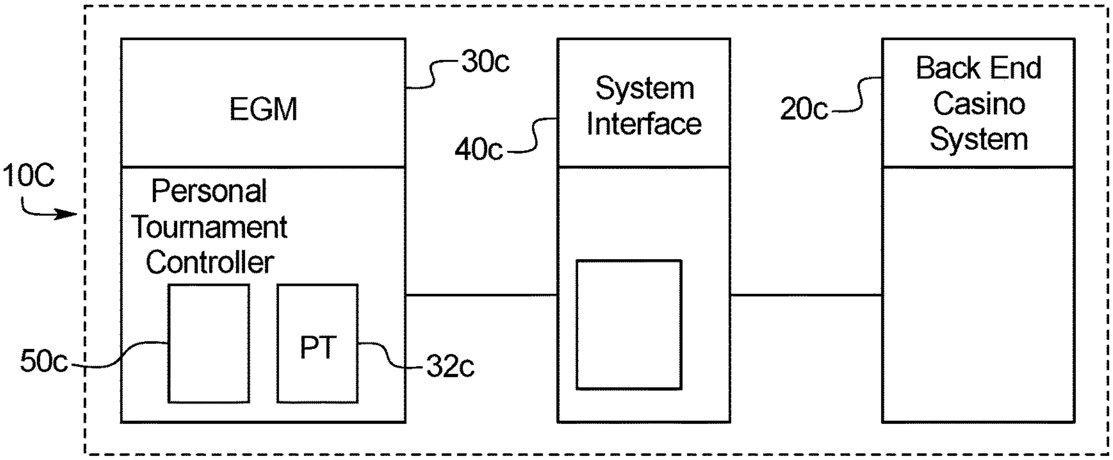
FIG. 3 is a schematic diagram of a personal tournament gaming system of another example embodiment of the present disclosure.

FIG. 3 shows a third example embodiment of the present disclosure. In this example embodiment, the gaming system 10C includes one or more back-end casino systems such as back-end casino system 20*c*, one or more EGMs such as EGM 30*c*, and one or SMIBs such as SMIB 40*c*. Each SMIB can be within of the cabinet of the respective EGM or outside of the cabinet of the respective EGM. The EGMs each include a PTC such as the PTC 50$c$ in EGM 30$c$. The PTC 50$c$ controls each personal tournament on the EGM 30$c$ and communicates all data for each personal tournament as needed to the back-end casino system 20$c$ via the SMIB 40$c$. In this example, the EGM 30$c$ displays a personal tournament interface 32$c$ that displays the play of the personal tournament.

In various such embodiments, a personal tournament interface can be employed for additional functions such as but not limited to notifying the player they have qualified for a personal tournament, that they can sign up for a personal tournament, join a personal tournament, pay an entry payment for a personal tournament, view historic winners or personal tournament activity, etc.

Thus, various embodiments of the present disclosure do not limit where the PTC or the various components of the PTC are architecturally present. Additionally, various embodiments of the gaming system of the present disclosure can include one or more suitable additional components such but not limited to one or more of the components described below in the second section of this description.

In various embodiments, the PTC is configured to: (1) cause an EGM to display indications of the selectable personal tournaments (and related information such as mentioned above) available via the EGM and that are selectable by the player of the EGM; (2) enable the player to select one of the indicated selectable personal tournaments to play; (3) enable the player to pay for the selected personal tournament (if necessary); (4) enable the EGM to display and otherwise enable the player to play the player selected personal tournament; and (5) determine, cause the display of, and cause the provision of any award amounts resulting from the play of the player selected personal tournament. In various other embodiments, only one personal tournament is provided for play by the player at a point in time, and thus the gaming system does not provide the player with an opportunity to select which personal tournament the player wants to play; but rather provides the player an option to play the single personal tournament.

In various embodiments, the PTC is configured, for each of the personal tournaments, to: (1) receive and transmit data associated with the selectable personal tournaments available via the EGM; (2) receive and transmit data associated with selected personal tournament; (3) receive and transmit data associated with an entry payment for the selected personal tournament (if necessary); (4) receive and transmit data associated with play of the selected personal tournament at the EGM; and (5) receive and transmit data associated with the determination and display of any award(s) resulting from with the play of the personal tournament, and to cause payment of any such awards to the player.

In various embodiments, the PTC is configured to track data associated with the play of the personal tournament via the EGM, such as, but not limited to: (a) the game session, (b) game status, (c) game name, (d) game type, (e) coin-in amount, (f) game result(s) (e.g., win or loss), (g) wager amount, (h) time/duration, (i) player associated with the session (e.g., playerId, rank, player visit information, etc.), and/or (j) amount of funds on the EGM's credit meter In various embodiments (such as further described below), the gaming system including the PTC is thus specifically configured to facilitate personal tournaments where the play of the personal tournament is toward a standard instead of against other players. This transforms the gaming system in a manner that links game plays in a manner that progress toward a standard.

In various embodiments (such as further described below), the gaming system including the PTC is configured to facilitate a credit transfer from a credit meter on the EGM for the entry payment by the player for the play of the personal tournament (if necessary).

In various embodiments (such as further described below), the gaming system including the PTC is configured to facilitate a credit transfer to a credit meter on the EGM for any award amounts for the player resulting from the play of the personal tournament by the player.

In various embodiments (such as further described below), the gaming system including the PTC is configured to facilitate monetary transfers from an electronic player funds account for the entry payment by the player for the play of the personal tournament (if necessary).

In various embodiments (such as further described below), the gaming system including the PTC is configured to facilitate monetary transfers to an electronic player funds account for any award amounts for the player resulting from the play of the personal tournament by the player.

In various embodiments, the gaming system including the PTC controller EGM is configured to cause a display device of the EGM to display indications regarding: (1) the selectable personal tournaments available via the EGM; (2) the player selected personal tournament; (3) payment for the selected personal tournament (if necessary); and (4) the play of the player selected personal tournament. In various such embodiments, these displays are outside of any respective service windows displayed by on a display device of the EGM under the control of the SMIB of or associated with the EGM.

In various embodiments, the EGM is configured to selectively display a service window via a display device of the EGM such as under the control of the SMIB of or associated with that EGM. In various embodiments, the PTC controller is configured to operate with the SMIB and the EGM to cause the service window to display indications regarding: (1) the selectable personal tournaments (and related information as mentioned above) available via the EGM; (2) the player selected personal tournament; (3) the entry payment for the selected personal tournament (if necessary); and (4) the play of the player selected personal tournament. In various such embodiments, the display of the service window by the EGM is on part of a display device of the EGM that displays the game interface but that is separate from the displayed game interface. In various embodiments, the SMIB and PTC control the service window and displays thereof separately from the processor(s) of the EGM that controls and causes the displays the games displayed by the EGM via the game interface. For example, the SMIB and PTC can cause an overlay of the service window on a portion (e.g., top, bottom, left, or right) of the EGM display device such that the service window displays the personal tournament related displays in real-time while not preventing the display of plays of one or more games (such as primary wagering games and secondary games) on the EGM. In various such embodiments, the SMIB and PTC provide the service window in a manner that facilitates an interactive player interface that the SMIB and PTC to provide the various personal tournament related functions as described herein.

In various embodiments, the PTC controller is configured to operate with the SMIB and the EGM to cause a secondary display device of the EGM to display indications regarding: (1) the selectable personal tournaments (and related information as mentioned above) available via the EGM; (2) the player selected personal tournament; (3) the entry payment for the selected personal tournament (if necessary); and (4) the play of the player selected personal tournament. In various such embodiments, the secondary display device of the EGM is separate from the display device of the EGM that displays the game interface. In various embodiments, the SMIB and PTC control the secondary display device separately from the processor(s) of the EGM that controls and causes the displays the games displayed by the EGM via the game interface displayed on the primary display device of the EGM.

In various embodiments, the gaming system including the PTC is configured to cause the EGM to display (such as via one of the different display mechanisms described above) an indication to the player of an EGM that one or more personal tournaments are available for the player to select and play.

In various embodiments, the gaming system including the PTC is configured to enable the player to make an input via an input device of the EGM that causes the EGM to display (such as via one of the different display mechanisms described above) an indication to the player of the EGM of one or more personal tournaments are available for the player to select and play.

In various embodiments, the gaming system including the PTC can be configured to cause the EGM to display indications of one or more personal tournaments (and related information as mentioned above) are available for the player to select and play in another suitable manner.

In various embodiments, the gaming system including the PTC is configured to cause the EGM to display (such as via one of the different display mechanisms described above) to display, for each selectable personal tournament the game, the standard(s), any interim standard(s), the entry payment, and the award amount(s) available to be won via the play of that personal tournament.

In various embodiments, the gaming system including the PTC is configured to cause the EGM to display (such as via one of the different display mechanisms described above) each selectable personal tournament that does not require any entry payment amount by the player for a play of that personal tournament (and the awards available to be won via play of that personal tournament).

In various embodiments, the gaming system including the PTC is configured to cause the EGM to display (such as via one of the different display mechanisms described above) each selectable personal tournament that does not require any entry payment amount by the player for a play of that personal tournament (without displaying one or more or all of the award amounts available to be won via play of that personal tournament).

In various embodiments, where the personal tournament does not require any entry payment amount by the player for a play of that personal tournament, the funding for the personal tournament can be provided by the operator of the personal tournament in another suitable manner (such as via marketing dollars, promotional dollars, etc.).

In various embodiments, the gaming system including the PTC is configured to cause the EGM, responsive to an input by a player to play a personal tournament that does not require any entry payment amount by the player for the play of that personal tournament, to cause the EGM to display (such as via one of the different display mechanisms described above) the play of the selectable personal tournament to the player without any fund or credit transfers.

In various embodiments, the gaming system including the PTC is configured to cause the EGM, responsive to an input by a player to play a personal tournament that requires an entry payment amount by the player for the play of that personal tournament, to facilitate the entry payment by the player prior to causing the EGM to display (such as via one of the different display mechanisms described above) the play of the personal tournament to the player.

In various embodiments, the gaming system including the PTC is configured to cause the EGM, after completing the process facilitating any necessary entry payment from the player for the play of the personal tournament (as further discussed below), to facilitate the EGM to display (such as via one of the different display mechanisms described above) the play of the personal tournament to the player.

In various embodiments, the PTC completely controls the play of the personal tournament displayed by the EGM to the player. When the PTC is in total control of the play of the personal tournament, the PTC controls and the EGM displays all determinations and decisions on the outcome (e.g., symbols displays) and associated determinations of whether the relevant standard for the play of the personal tournament game is achieved or exceeded.

In various embodiments, the PTC and the EGM jointly control the play of the personal tournament displayed by the EGM to the player. When the PTC and the EGM are jointly in control of the play of the personal tournament, the PTC and EGM control and the EGM displays all determinations and decisions on the outcome (e.g., symbols displays) and associated determinations of whether the relevant standard for the play of the personal tournament game is achieved or exceeded.

In various embodiments, the PTC enables the EGM to control the play of the personal tournament displayed by the EGM to the player. In various embodiments, the EGM sends the data related to the outcome(s) of the play of the personal tournament displayed to the PTC. When the EGM is in total control of the play of the personal tournament, the EGM controls all determinations and decisions on the outcome(s) (e.g., symbols displays) and associated determinations of whether the relevant standard (and any interim standards) for the play of the personal tournament game is/are achieved or exceeded.

In various embodiments, the gaming system including the PTC enables the play of the personal tournament by the player in only a single tournament game play session.

In various embodiments, the gaming system including the PTC enables the play of the personal tournament by the player in multiple tournament game play sessions.

Figure 4:
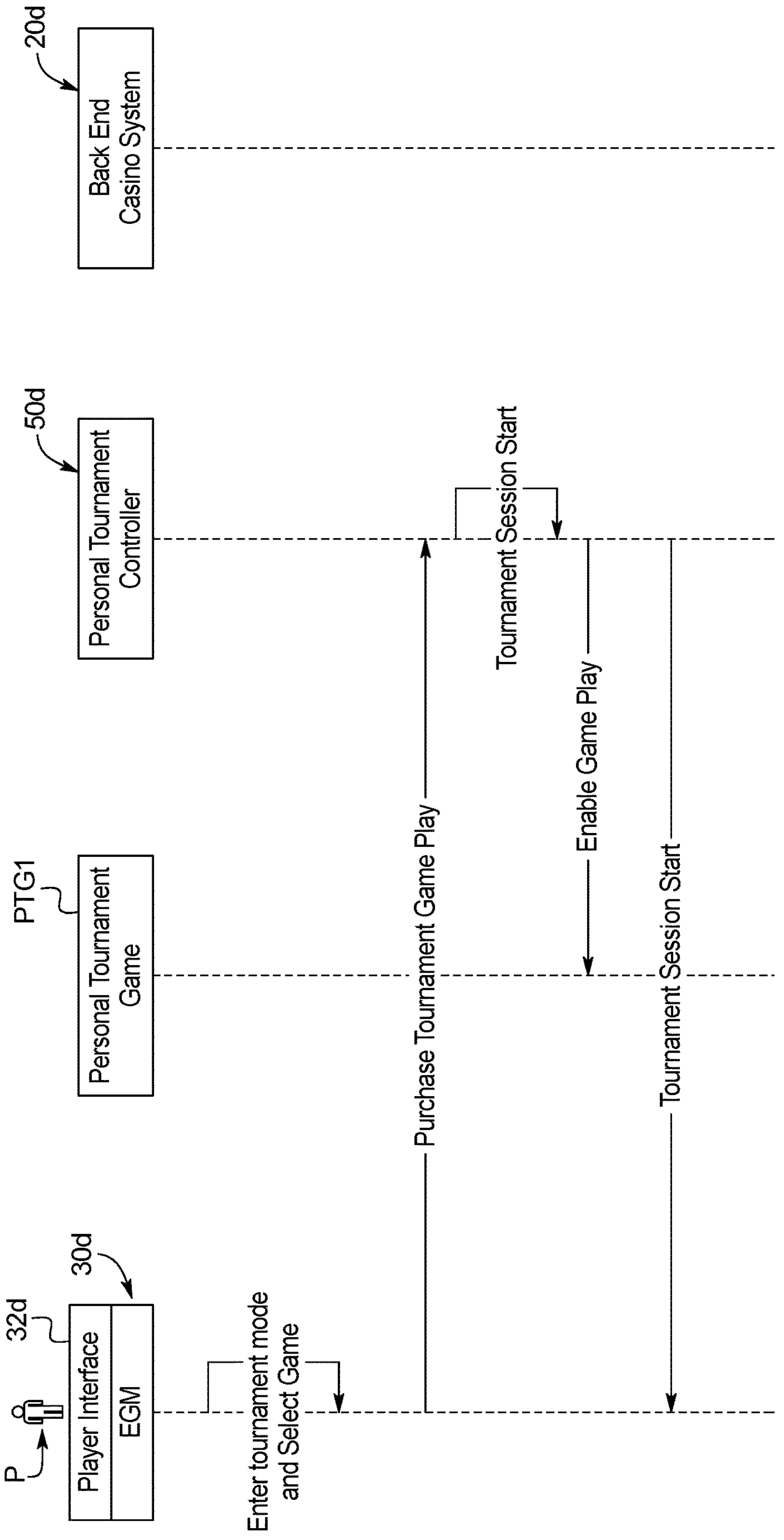
FIG. 4 is a flow diagram of a method for operating a personal tournament gaming system of one example embodiment of the present disclosure.

FIG. 4 illustrates a method of operation of a gaming system of one example embodiment of the present disclosure. This example gaming system includes a back-end casino system 20*d*, an EGM 30*d*, a SMIB (not shown), and a PTC 50*d*. The EGM 30*d* displays a player interface 32*d* that enables a player P to interact with the EGM 30*d* to select, pay for, and play a personal tournament PTG1 controlled by a PTC 50*d*. The play of the personal tournament PTG1 includes a plurality of plays of a tournament game. In this example, the EGM 30*d* and the PTC 50*d* enable the player to request the EGM 30*d* to enter a personal tournament mode, enable the player to select the personal tournament PTG1, enable the player to pay for the play of the personal tournament PTG1 (via the player's electronic funds player account wallet or via player credits on the EGM 30*d*), and provide a session of the play of the personal tournament PTG1 via the EGM 30*d*. As seen in this example, the PTC 50*d* controls the tournament session start and enables play of the tournament games that are part of the play of the personal tournament.

Figure 5:
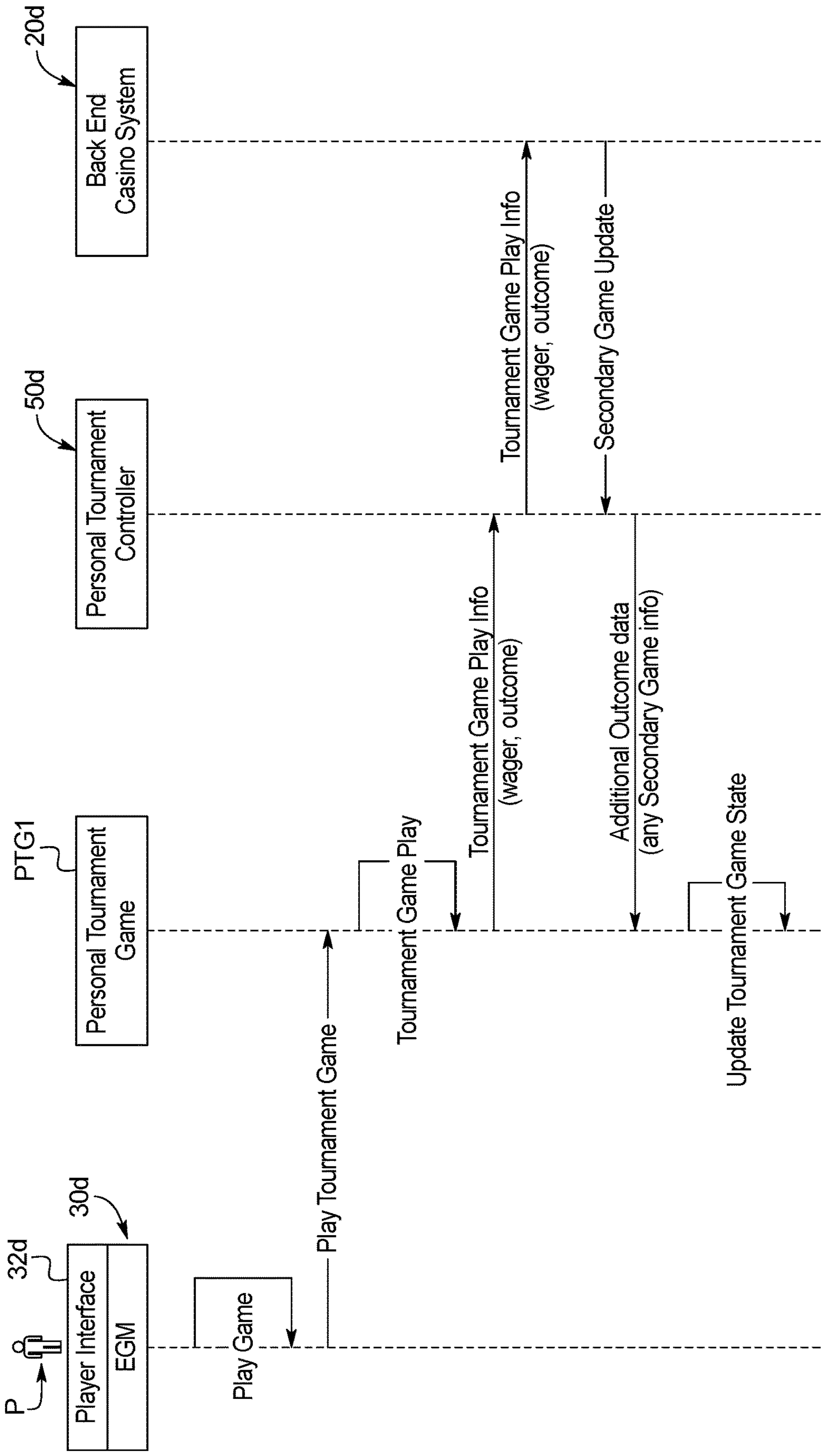
FIG. 5 is a flow diagram of a method for operating a personal tournament gaming system of another example embodiment of the present disclosure.

FIG. 5 illustrates a method of operation of a gaming system of one example embodiment of the present disclosure. In this example embodiment, the gaming system (such as the gaming system of FIG. 4) includes the PTC 50*d* that functions during the play of the personal tournament (such as during the play game cycles) to update the personal tournament game play information (based on game play outcomes) received from the EGM 30*d* after each or after a plurality of game plays of the play of the personal tournament on the EGM 30*d*. The game play outcomes are sent to the PTC 50*d* and returned by the PTC 50*d*. The PTC 50*d* functions with the back-end casino system 20*d* to determine any secondary game (such as further described below) and secondary game information to provide back to the EGM 30*d* based on these tournament game play outcomes of the play of the personal tournament.

Figure 6:
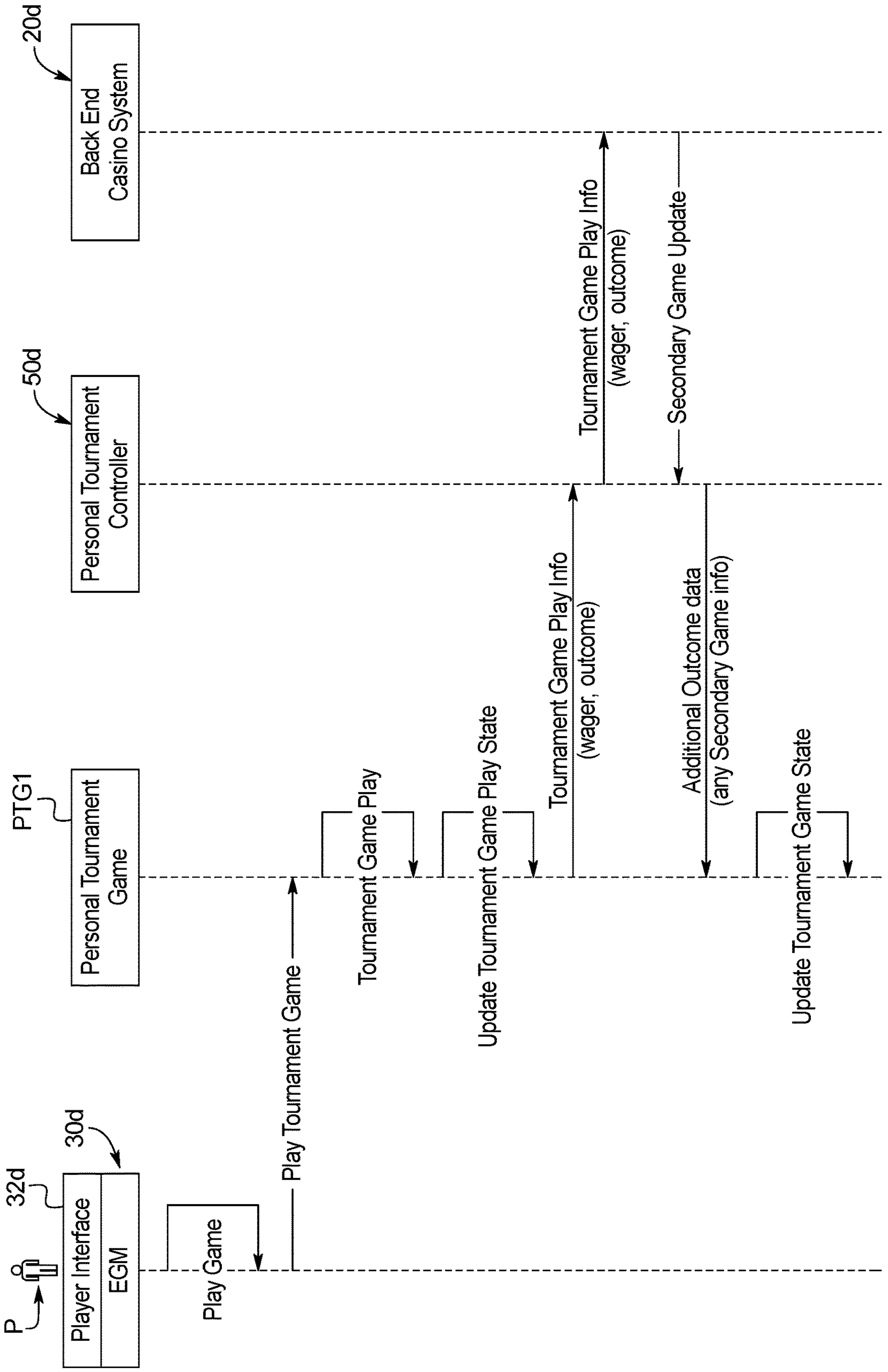
FIG. 6 is a flow diagram of a method for operating a personal tournament gaming system of another example embodiment of the present disclosure.

FIG. 6 illustrates a method of operation of a gaming system of one example embodiment of the present disclosure. In this example embodiment, the gaming system (such as the gaming system of FIG. 4) a PTC 50*d* that is external to the individual game plays of the play of the personal tournament but still provides updates to the back-end casino system 20*d*. The game play outcomes are sent to the PTC 50*d*. The PTC 50*d* functions with the back-end casino system 20*d* to determine any secondary game (such as further described below) and secondary game information to provide back to the EGM 30*d* based on the tournament game play outcomes of the play of the personal tournament.

As indicated above, the play of the personal tournament can require an entry payment by the player, and the entry payment can be suitable amount of money (or other suitable payment such as discussed below).

In various embodiments, separate and independent from the entry payment amount for the play of the personal tournament, the PTC determines one or more different characteristics for the play of the personal tournament. The characteristic can include, but are not limited to the following characteristics: (1) the symbol displays (such as reels, wheels, cards, etc.) for each play of the tournament game of the play of the personal tournament; (2) the standard(s) for the play of the personal tournament; (3) the quantity of game plays (such as game activations, spins, re-spins, attempts, deals, draws, etc.) for the play of the personal tournament; (4) the time period for the play of the personal tournament; and (5) the type, denomination, and total quantity of units (such as credits, points, etc.) usable by the player for the play of the personal tournament; (6) whether units (such as credits, points, etc.) usable by the player that are exhausted, can be replenished to continue and/or complete the play of the personal tournament.

In various embodiments, based directly on the entry payment amount for the play of the personal tournament, the PTC determines one or more of the above listed different characteristics for the play of the personal tournament.

In various embodiments, the PTC directly links one or more of the above characteristics to specific individual entry payments for the play of the personal tournament. In various example embodiments, the PTC can enable each play of a tournament game of the play of the personal tournament to be paid for by the player on an individual basis (such as for each activation or single game cycle, a single spin, a single re-spin, a single attempt, a single deal, a single draw, etc. of the symbol displays of the tournament game). In various other example embodiments, the PTC can enable play of the tournament game of the play of the personal tournament to be paid for by the player on a group basis for a groups of tournament game plays (such as 5 game activations, 5 spins, 5 re-spins, 5 attempts, 5 deals, 5 draws, etc. of the symbol displays) of the personal tournament.

In various such embodiments, the gaming system including the PTC enables the player to continue to make such individual or groups entry payments for the continued play of the personal tournament if the player determines that play of the personal tournament is going well and/or enjoyable for the player.

In various such embodiments, the gaming system including the PTC enables the player to discontinue making such individual or groups entry payments for the continued play of the personal tournament if the player determines that play of the personal tournament is not going well and/or not enjoyable for the player.

Thus, in various embodiments, the PTC enables the player to opt into a play of a personal tournament, see a few tournament game plays (such as 10 game activations, 10 spins, 10 re-spins, 10 attempts, 10 deals, 10 draws, etc.) of the play of the personal tournament, determine that the play of the personal tournament is going well or not going well, and remain in or opt out of the play of the personal tournament.

In various other embodiments where the gaming system or PTC requires a player to make the entry payment for the entire play of the personal tournament, the gaming system including the PTC, either before or after the play of the personal tournament begins, can enable the player to purchase insurance related to the play of the personal tournament. This insurance functions as hedge payment that enables a player to pay additional funds for the opportunity to obtain a return of all or a portion of the player's entry payment for the play of the personal tournament.

In various other embodiments, the gaming system including the PTC, can provide, without requiring any entry payment from the player, one or more tournament game plays (such as 4 game activations, 4 spins, 4 re-spins, 4 attempts, 4 deals, 4 draws, etc.) for the play of the personal tournament; and then subsequently require the player to make an entry payment for the rest of the play of the personal tournament. Thus, the player can determine that the play of the personal tournament is going well or not going well, and opt in for the rest of the play of the personal tournament by making the entry payment for the play of the personal tournament.

As indicated above, in various embodiments, the gaming system including the PTC require the player to make a monetary entry payment for the play of the personal tournament (such as via credits on the EGM or funds in an electronic player funds account).

Figure 7:
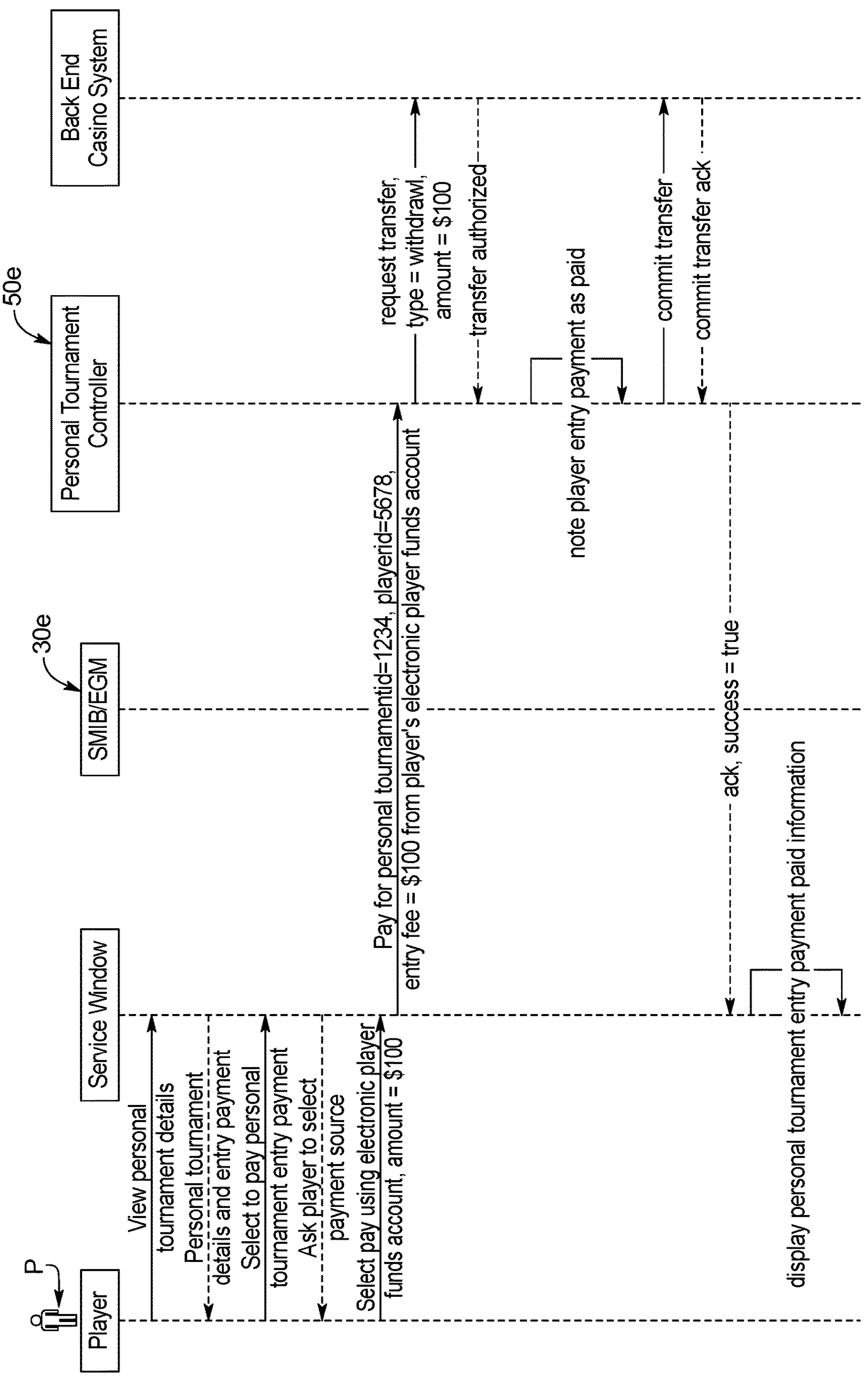
FIG. 7 is a flow diagram of a method for operating a personal tournament gaming system of another example embodiment of the present disclosure.

FIG. 7 illustrates a method of operation of a gaming system of one example embodiment of the present disclosure. FIG. 7 shows one example embodiment where the EGM 30*e* and PTC 50*e* enable the player to pay the entry payment for the play of the personal tournament using funds held in the player's electronic player funds account. In the example embodiment, the player electronic player funds player account may or may not be associated with or linked to a player tracking account of this player. In this example embodiment, the player interacts with the service window to select the personal tournament, authorize payment for the play of the selected personal tournament via the player's electronic player funds accounts, and receives a confirmation of the payment for the play of the selected personal tournament after the EGM 30*e* (including the SMIB in this example embodiment), and the PTC 50*e* facilitates such entry payment through accessing the player's electronic player funds account. Such access can be via any known or newly developed method.

Figure 8:
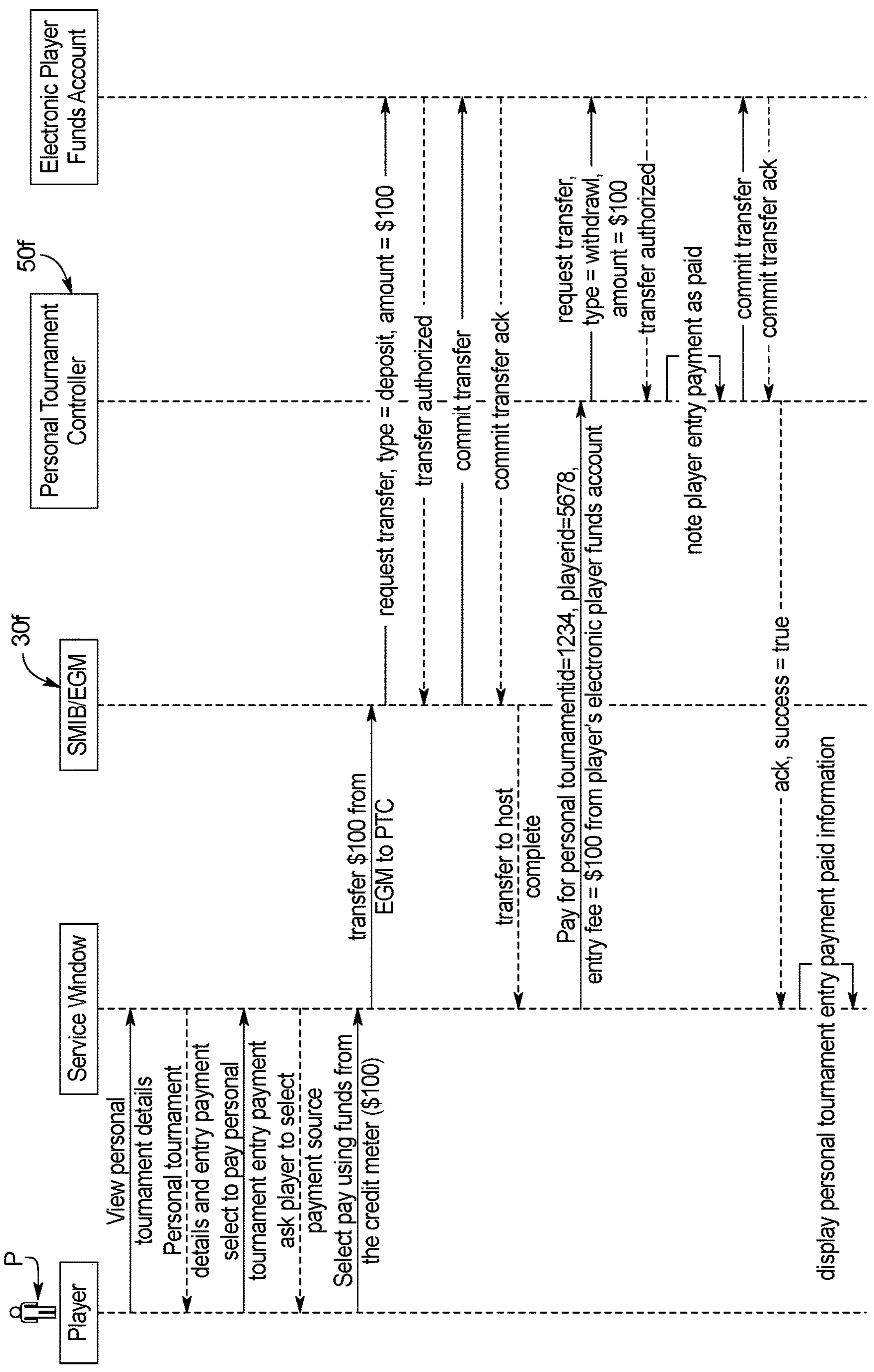
FIG. 8 is a flow diagram of a method for operating a personal tournament gaming system of another example embodiment of the present disclosure.

FIG. 8 illustrates a method of operation of a gaming system of one example embodiment of the present disclosure. FIG. 8 shows another example embodiment where the EGM 30*f* and PTC 50*f* enable the player to pay the entry payment for the play of the personal tournament using funds held in the player's electronic player funds account. In the example, the player is playing at an EGM 30*f* and has transferred all of the funds held in the player's electronic funds player account to the EGM 30*f*. If the player decides to use those funds to pay the entry payment for a play of a personal tournament, the funds associated with the entry payment can be first transferred from the EGM 30*f* back to the player's electronic player funds account, and then transferred out of the player's electronic player funds account to pay the entry payment for the play of the personal tournament such as shown in FIG. 8.

In various embodiments, instead of employing a service window for content communication (via the EGM and/or SMIB) to transfer funds from the credit meter of the EGM back to the player's electronic player funds account, the PTC can cause the transfer of funds from the EGM's credit meter by requesting the EGM and/or SMIB to perform the transfer to the player's electronic player funds account.

Figure 9:
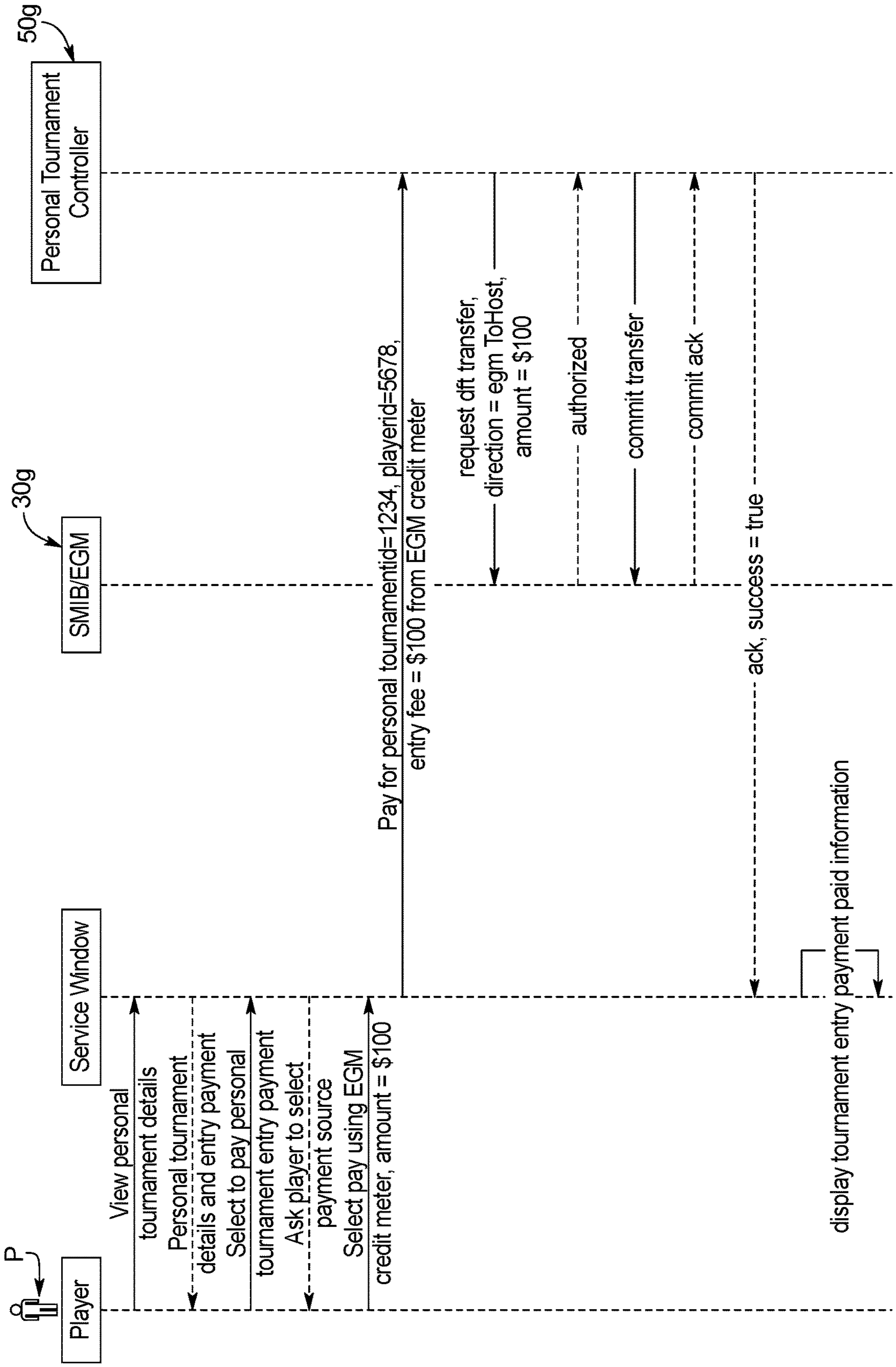
FIG. 9 is a flow diagram of a method for operating a personal tournament gaming system of another example embodiment of the present disclosure.

FIG. 9 illustrates a method of operation of a gaming system of one example embodiment of the present disclosure. FIG. 9 shows an example embodiment where the gaming system including the EGM 30*g* and PTC 50*g* enable the player to pay the entry payment for the play of the personal tournament using funds on the EGM's credit meter (such as where the player doesn't have an electronic player funds account, does not have funds in the player's electronic player funds account, or does not want to use funds in the player's electronic player funds account). The gaming system can enable the player to pay for the entry payment for the play of the personal tournament by making an input that causes funds from the credit meter of the EGM 30*g* wherein the EGM employs a host transfer protocol that facilitates this direct funds transfer. This direct funds transfer causes credits from the credit meter of the EGM 30*g* to be transferred to the PTC 50*g* or to back-end casino system (not shown) via the PTC 50*g* for the entry payment.

In various other embodiments, the gaming system including the PTC can enable (or alternatively require) the player to make an entry payment for the play of the personal tournament in another suitable manner such as using non-monetary units (such as points, promotional points, non-cashable credits, player tracking points, etc.). In various embodiments, such non-monetary units are associated with the player's patron loyalty account or another suitable account. Player tracking points are thus used as an example here, but are not meant to limit the present disclosure.

Figure 10:
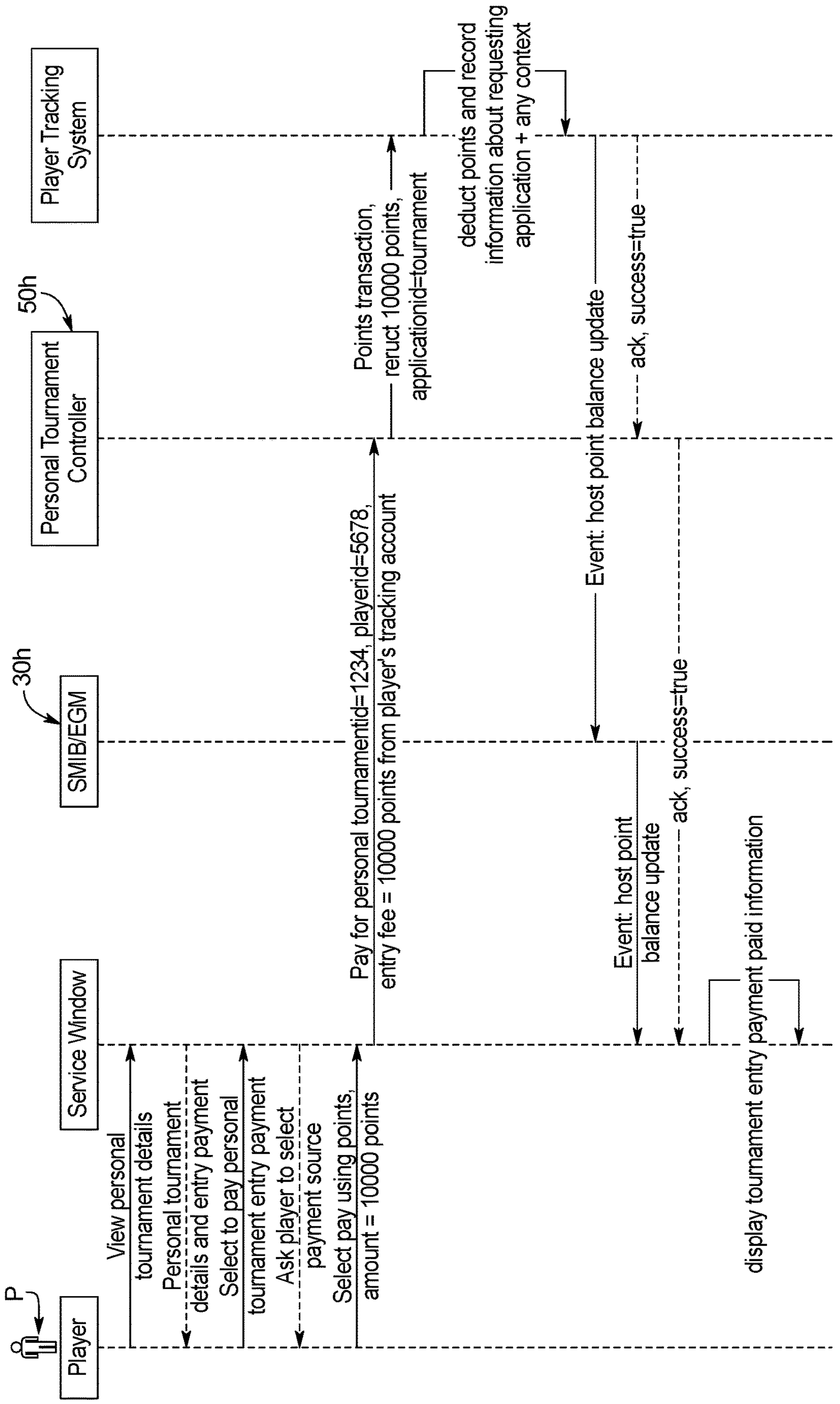
FIG. 10 is a flow diagram of a method for operating a personal tournament gaming system of another example embodiment of the present disclosure.

FIG. 10 illustrates a method of operation of a gaming system of one example embodiment of the present disclosure. FIG. 10 shows an example embodiment where the EGM 30*h* and PTC 50*h* enable the player to pay the entry payment for the play of the personal tournament using a quantity of points in the player's club account. In this example embodiment, the PTC 50*h* is configured to directly communicate with and access a player tracking system (not labeled). In other example embodiments, the PTC 50*h* is configured to indirectly communicate with and access a player tracking system such as via a back-end casino system or one or more other systems. In this example embodiment, the gaming system via the service window enables the player to pay for the entry payment for the play of the personal tournament by making an input that causes points from the player's player tracking account to be used to play for the entry payment. More specifically, in this example embodiment, the player interacts with the service window to select the personal tournament, authorize payment for the play of the selected personal tournament via the player's player tracking funds account, and receives a confirmation of the entry payment for the play of the selected personal tournament after the EGM 30*h* (including the SMIB in this example embodiment), and the PTC 50*h* facilitates such entry payment through accessing the player's player tracking account. Such access can be via any known or newly developed method.

This example embodiment provides a significant technical advantage provided by the present disclosure in that it enables use of player tracking points for plays of personal tournament where the player plays against a standard (instead of other players). This enables players to use their player tracking points while playing at an EGM in a new a different manner and enables casinos to significantly reduce the quantity of player tracking points accumulated on their accounting records for players. This technical structure thus enables such use of player tracking points in a new manner.

Thus, in various embodiments, entry into the personal tournament is free or non-monetary, and the tournament game plays that are provided to the player during the play of the personal tournament are also free or non-monetary.

In various embodiments, entry into the personal tournament is free or non-monetary, but the gaming system requires monetary payment for one or more of the play of the tournament game during the personal tournament.

As explained above, in various embodiments, the player is not playing against other players in the play of the personal tournament, but rather against a standard and in various embodiments one or more interim standards such as described above.

In various embodiments, if the player achieves the standard or one or more of the interim standards, the gaming system provides the player one or more awards for the play of the personal tournament.

In various embodiments, if the player achieves or exceeds the standard or one or more of the interim standards, the gaming system provides the player one or more awards for the play of the personal tournament. For example, if the player pays an entry payment of $20.00 for the play of the personal tournament, and if the player achieves the standard for the play of the personal tournament, then the gaming system provides the player $100.00 static award amount for the play of the personal tournament (such as indicated by the gaming system as the award amount when the player selects the personal tournament to play).

In various embodiments, if the player achieves more than the standard for the play of the personal tournament, the gaming system still only provides the player the static award for the play of the personal tournament. For example, if the player pays an entry payment of $20.00 for the play of the personal tournament, and if the player exceeds the standard for the play of the personal tournament, then the gaming system provides the player $100.00 static award amount for the play of the personal tournament (such as indicated by the gaming system as the award amount when the player selects the personal tournament to play).

In various embodiments, if the player achieves more than the standard for the play of the personal tournament, the gaming system provides the player more than the static award for the play of the personal tournament. For example, if the player pays an entry payment of $20.00 for the play of the personal tournament, and if the player exceeds the standard for the play of the personal tournament, then the gaming system provides the player $120.00 static award amount for the play of the personal tournament (which is more than the award amount indicated by the gaming system when the player selects the personal tournament to play).

In various such embodiments, the increase in the award amount is linear. For example, if the player pays an entry payment of $20.00 for the play of the personal tournament, and if the player exceeds the standard for the play of the personal tournament by more than 10%, then the gaming system provides the player an award amount that is 10% greater such as $110.00 in this example for the play of the personal tournament. In this example, if the player pays an entry payment of $20.00 for the play of the personal tournament, and if the player exceeds the standard for the play of the personal tournament by more than 20%, then the gaming system provides the player an award amount that is 20% greater such as $120.00 in this example for the play of the personal tournament.

In various such embodiments, the increase in the award amount is logarithmic. For example, if the player pays an entry payment of $20.00 for the play of the personal tournament, and if the player exceeds the standard for the play of the personal tournament by more than 10%, then the gaming system provides the player an award amount that is double the original award amount such as $200.00 in this example for the play of the personal tournament. In this example, if the player pays an entry payment of $20.00 for the play of the personal tournament, and if the player exceeds the standard for the play of the personal tournament by more than 20%, then the gaming system provides the player an award amount that is quadruple the original award amount such as $400.00 in this example for the play of the personal tournament. In this example, if the player pays an entry payment of $20.00 for the play of the personal tournament, and if the player exceeds the standard for the play of the personal tournament by more than 30%, then the gaming system provides the player an award amount that is 8 times the original award amount such as $800.00 in this example for the play of the personal tournament.

Thus, it should be appreciated that in various embodiments, the gaming system including the PTC enables the player to continue the play of the personal tournament after achieving the standard for that play of the personal tournament. For example, if the play of the tournament game includes 50 plays of the tournament game of the personal tournament, and the player achieves the standard for that play of the personal tournament in the 40th play of the tournament game, the gaming system including the PTC enables the player to continue the 10 remaining plays of the tournament game after achieving the standard for that play of the personal tournament, and thus the player can exceed the standard for that play of the personal tournament.

In various embodiments where the gaming system including the PTC enables the player to continue the play of the personal tournament after achieving the standard for that play of the personal tournament, the amount the player can exceed the standard and/or the award amount(s) for exceeding the standard can be capped. For example, if a player achieves 200% more than the standard for the play of the personal tournament, the award for the play of the personal tournament can be capped at 150% of the static award amount.

In various other embodiments where the gaming system including the PTC enables the player to continue the play of the personal tournament after achieving the standard for that play of the personal tournament, the amount the player can exceed the standard and/or the award amount(s) for exceeding the standard is not capped.

In various other embodiments, the gaming system including the PTC does not enable the player to continue the play of the personal tournament after achieving the standard for that play of the personal tournament. For example, if the play of the tournament game includes 50 plays of the tournament game of the personal tournament, and the player achieves the standard for that play of the personal tournament in the 40th play of the tournament game, the gaming system including the PTC ends the play of the personal tournament without enabling the player to continue the 10 remaining plays of the tournament game after achieving the standard for that play of the personal tournament, and thus the player cannot exceed the standard for that play of the personal tournament.

In various embodiments, in addition to or instead of providing one or more awards for the play of the personal tournament (if the player achieves or exceeds the standard or one or more of the interim standards), the gaming system provides the player one or more post-personal tournament secondary game plays. The one or more post-personal tournament secondary game plays can be of suitable displayed secondary games that can result in one or more secondary awards that the gaming system provides to the player. The gaming system can provide such the one or more post-personal tournament secondary game plays if the player achieves or exceeds the standard for the play of the personal tournament, an interim standard for the play of the personal tournament, part of a standard for the play of the personal tournament, a difference between the standard and the amount of the standard achieved by the player for the play of the personal tournament, or any other criteria associated with the play of the personal tournament.

In various embodiments, in addition to or instead of providing one or more static awards for the play of the personal tournament (if the player achieves or exceeds the standard or one or more of the interim standards), the gaming system provides the player one or more progressive awards for the play of the personal tournament. In various embodiments, the progressive award(s) can be funded by a portion of the player's entry payment and/or in another suitable manner. In various embodiments, one or more of the progressive award(s) can be a mystery progressive award, a lucky coin progressive award, or other suitably determined progressive award, determined and controlled by the EGM, PTC, or back-end casino system.

The progressive awards, when the progressive awards are paid, how the progressive awards are determined to be provided to players of the personal tournament can be determined in various different manners in accordance with the present disclosure.

In various embodiments, for a period of time where a progressive award is ready to be provided, if no players are actively playing a personal tournament, the PTC can provide a progressive award to the next player who plays the personal tournament and meets the standard for that play of the personal tournament.

In various embodiments, for a period of time where a progressive award is ready to be provided if no players are actively playing a personal tournament, the PTC can rollover a progressive award and provide a new set of parameters for winning the progressive award (although the progressive award would be added to the reset amount of the progressive award plus the rollover amount).

In various embodiments, the progressive award is a symbol driven progressive award where PTC provides the progressive award if one or more certain outcome occur during a play of a personal tournament by a player. In other words, if the outcome(s) occurs during the play of the personal tournament, the PTC and/or EGM provide the progressive award to the player. The outcome(s) can be related or unrelated to the standard and/or interim standards for the play of the personal tournament. In various such embodiments, the EGM reports the occurrence of the outcome(s) to the PTC, and the PTC authorizes the EGM to pay the player the progressive award.

Figure 11:
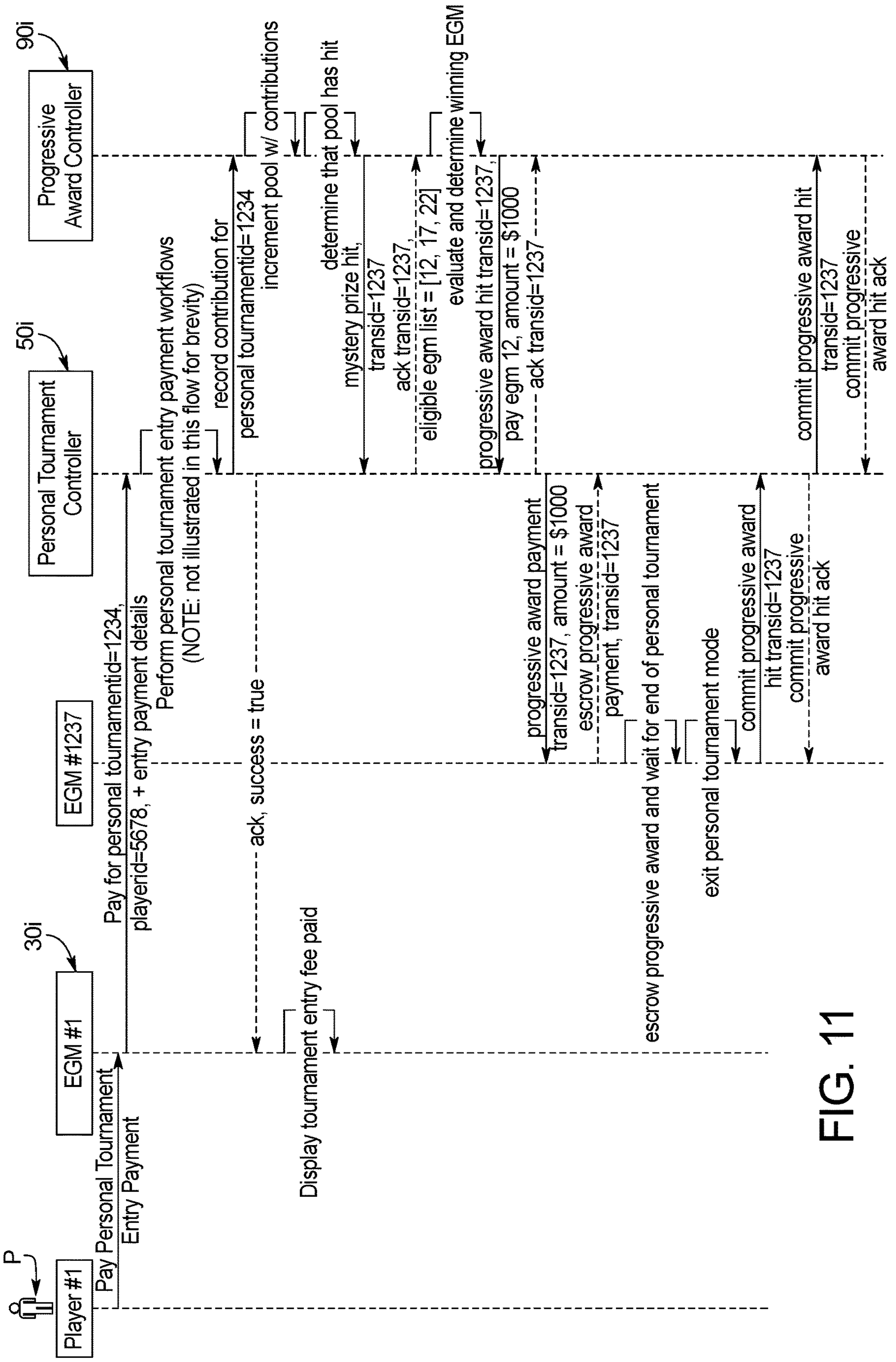
FIG. 11 is a flow diagram of a method for operating a personal tournament gaming system of another example embodiment of the present disclosure.

FIG. 11 illustrates a method of operation of a gaming system of one example embodiment of the present disclosure. FIG. 11 shows an example embodiment where the EGM 30*i* and PTC 50*i* are configured to operate with a progressive award controller 90*i* to provide a progressive award to a player for a play of a personal tournament.

Figure 12:
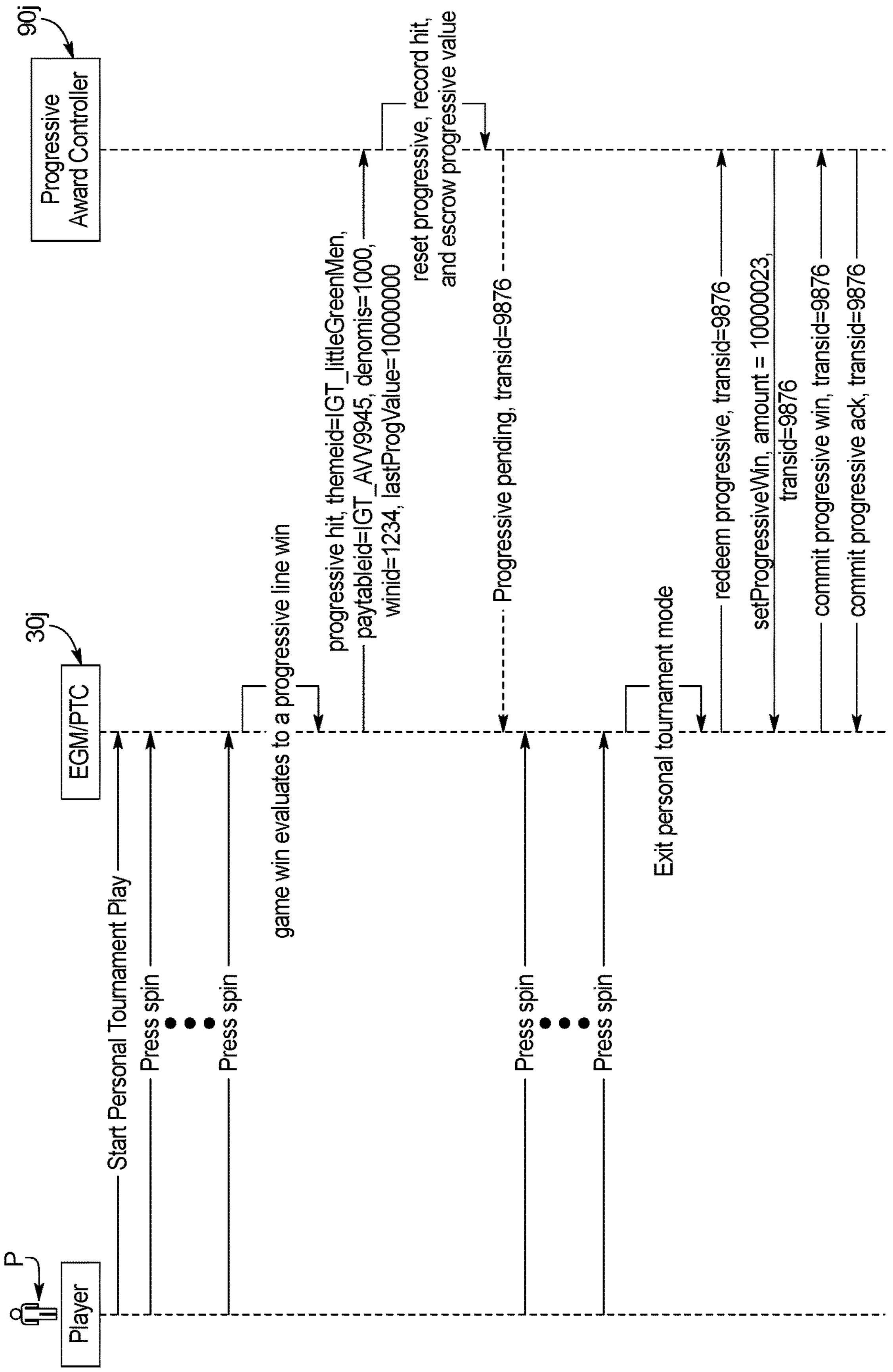
FIG. 12 is a flow diagram of a method for operating a personal tournament gaming system of another example embodiment of the present disclosure.

FIG. 12 illustrates a method of operation of a gaming system of one example embodiment of the present disclosure. FIG. 12 shows an example embodiment where the EGM 30*j* (with the PTC) is configured to operate with a progressive award controller 90*j* to provide a progressive award to a player for a play of a personal tournament.

In various embodiments such as shown in FIG. 12, the gaming system takes into account how a credit meter of an EGM can function during a play of a personal tournament game.

In various embodiments, the EGM's credit meter or an alternative or additional credit meter for the play of the personal tournament can be used to show a virtual credit value that is seeded by the EGM when the play of the personal tournament starts. If the player exhausts the virtual credit values during the play of the personal tournament, such as in a timed personal tournament, then EGM can re-hydrate the credit meter so the player can continue to play the personal tournament.

In various embodiments, for plays of a personal tournament, the EGM can have an initial credit meter value, and player plays until their credit meter is exhausted, or some time limit occurs. When a player wins a progressive award during a tournament, and if the EGM is playing in virtual credits, then the EGM can pay the progressive award at the conclusion of the play of the personal tournament (since the transaction with the host in anything other than virtual credits may not be allowed during the play of the personal tournament).

Figure 13:
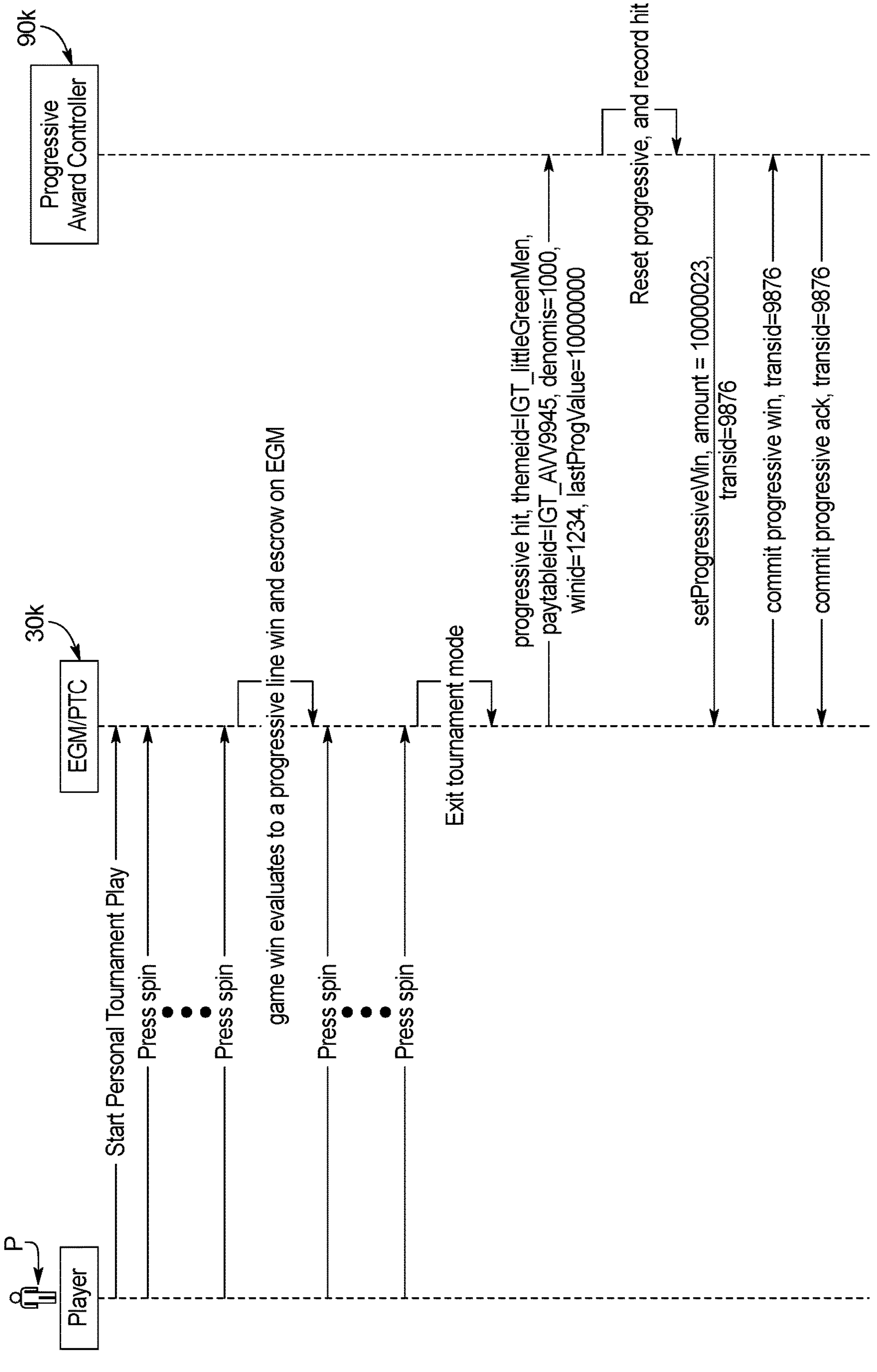
FIG. 13 is a flow diagram of a method for operating a personal tournament gaming system of another example embodiment of the present disclosure.

FIG. 13 illustrates a method of operation of a gaming system of one example embodiment of the present disclosure. FIG. 13 shows an example embodiment where the EGM 30*k* (with the PTC) is configured to operate with a progressive award controller 90*k* to provide a progressive award to a player for a play of a personal tournament.

In various embodiments such as shown in FIG. 13, the gaming system including the PTC and/or EGM can escrow a progressive award and subsequently provide the escrowed progressive award to player after the play of personal tournament is completed. This escrow on the EGM is illustrated in the diagrams above for the respective mystery and symbol driven progressive awards. One downside of this example gaming system configuration and method of operation shown in FIG. 13 is that it enables another EGM to potentially claim that the player of that EGM won the progressive award, since other EGM can potentially beat this EGM when claiming the progressive award (e.g., claiming that the progressive award triggering event occurred). Thus, the escrow configuration can be considered to be favorable to EGM escrowed progressive award hit processing during a play of personal tournament.

It should thus be appreciated that the awards winnable via the personal tournament can be any suitable awards such as, but not limited to: (1) monetary credits or currency; (2) non-monetary credits or currency; (3) a modifier (e.g., a multiplier) used to modify one or more awards; (4) one or more free plays of a game; (5) one or more plays of a bonus game (e.g., a free spin of an award wheel, a free spin of the award generator, etc.); (6) one or more lottery based awards (e.g., one or more lottery or drawing tickets); (7) a wager match for one or more plays of the wagering game; (8) an increase in an average expected payback percentage of a bonus game and/or an average expected payback percentage of a primary game for one or more plays; (9) one or more comps (such as a free meal or a free night's stay at a hotel); (10) one or more bonus or promotional credits usable for online play; (11) one or more player tracking points; (12) a multiplier for player tracking points; (13) an increase in a membership or player tracking level; (14) one or more coupons or promotions usable within a gaming establishment or outside of the gaming establishment (e.g., a 20% off coupon for use at a retail store or a promotional code providing a deposit match for use at an online casino); (15) an access code usable to unlock content on the Internet; (16) a progressive award; (17) a high value product or service (such as a car); and/or (18) a low value product or service.

In various embodiments, the EGM and PTC cause the award(s) resulting from achieving or exceeding the standard for the play of the personal tournament to be deposited in the player's electronic player funds account.

In various embodiments, the EGM and PTC cause the award(s) resulting from achieving or exceeding the standard for the play of the personal tournament to be deposited on the credit meter of the EGM.

In various embodiments, the EGM and PTC enable the player to selected where the award(s) resulting from achieving or exceeding the standard for the play of the personal tournament is deposited (such as in the player's electronic player funds account or on the credit meter of the EGM).

Thus, it should be appreciated from the above, that in various example embodiments, the gaming system including the PTC: (1) causes a display via an EGM a plurality of different personal tournaments (such as three different reel game based personal tournaments (such as PTG1, PTG2, and PTG3); (2) enables the player to select one of the personal tournaments (such as PTG2); (3) causes a display and enables the player to play the selected personal tournament (PTG2); determines if the player achieves or exceeds the standard for the play of the personal tournament; (4) determines any award for the play of the personal tournament based on whether the player achieves or exceeds the standard for the play of the personal tournament; and (5) causes a display of any such determined award and causes any such determined award to be provided to the player. It should be appreciated that while the tournament game is described as a reel slot game, the tournament game may be any suitable type of game such as a suitable video card game, a baccarat game, a keno game, a bingo game, or other such suitable game.

It should further be appreciated from the above, that various embodiments of the present disclosure provide a gaming system including a personal tournament controller, personal tournament controller comprising a processor and a memory device storing a plurality of instructions, that when executed by the processor, cause the processor to: (1) cause a display, by a display device of an electronic gaming machine, of an indication of personal tournament, wherein the personal tournament comprises a standard, and wherein the personal tournament is not against any other competitors, players, or electronic gaming machines, (2) cause a display, by the display device of the electronic gaming machine, of an indication of the standard of the personal tournament, (3) cause a display, by the display device of the electronic gaming machine, of a play of the personal tournament comprising a plurality of plays of a tournament game of the personal tournament, (4) cause a display, by the display device of the electronic gaming machine, of an indication that the standard for the play of the personal tournament is achieved or exceeded, and (5) cause a display, by the display device of the electronic gaming machine, of an indication of an amount based on the standard for the play of the personal tournament being achieved or exceeded. In various such embodiments, the gaming system is further configured to cause a service window displayed by the display device of the electronic gaming machine to display the indication of personal tournament, the indication of the standard of the personal tournament, the play of the personal tournament, the indication of the standard for the play of the personal tournament being achieved or exceeded, and the indication of the amount for the standard for the play of the personal tournament being achieved or exceeded. In various such embodiments, the standard for the play of the personal tournament comprises one of: a predetermined score, a predetermined quantity of credits won, a gross amount won, a net amount won, a quantity of winning tournament game plays, and an accumulation of certain quantity of one or more elements. In various such embodiments, the selected personal tournament comprises an interim standard, and the plurality of instructions, when executed by the processor, cause the processor to cause a display, by the display device of the electronic gaming machine, of an indication of the interim standard, an indication of the interim standard for the play of the personal tournament being achieved, and the indication of a benefit from the interim being achieved. In various such embodiments, the interim standard is part of the standard for the personal tournament. In various such embodiments, the interim standard is part of the standard is one of based directly on the standard for the personal tournament and based indirectly on the standard for the personal tournament. In various such embodiments, the interim standard is completely separate from and independent of the standard for the personal tournament. In various such embodiments, the gaming system is further configured to cause an entry payment for the play of the personal tournament to be paid from credits in a credit meter of the electronic gaming machine. In various such embodiments, the gaming system is further configured to cause an entry payment for the play of the personal tournament to be paid from funds in an electronic player funds account of the player. In various such embodiments, the gaming system is further configured to cause an entry payment for the play of the personal tournament to be paid via points in a player tracking account of the player.

It should further be appreciated from the above, that various embodiments of the present disclosure provide a gaming system including a personal tournament controller comprising a processor and a memory device storing a plurality of instructions, that when executed by the processor, cause the processor to: (1) cause a display, by a display device of an electronic gaming machine, of indications of a plurality of different personal tournaments, wherein each personal tournament comprises a standard, and wherein each personal tournament is not against any other competitors, players, or electronic gaming machines, (2) cause a display, by the display device of the electronic gaming machine, of an indication of a player selected one of the personal tournaments and the standard of the selected personal tournament, (3) cause a display, by the display device of the electronic gaming machine, of a play of the selected personal tournament comprising a plurality of plays of a tournament game of the selected personal tournament, (4) cause a display, by the display device of the electronic gaming machine, of an indication of the standard for the play of the selected personal tournament being achieved or exceeded, and (5) cause a display, by the display device of the electronic gaming machine, of an indication of an amount for the standard for the play of the selected personal tournament being achieved or exceeded. In various such embodiments, the gaming system is further configured to cause a service window displayed by the display device of the electronic gaming machine to display the indication of selected personal tournament, the indication of the standard of the selected personal tournament, the play of the selected personal tournament, the indication of the standard for the play of the selected personal tournament being achieved or exceeded, and the indication of the amount for the standard for the play of the selected personal tournament being achieved or exceeded. In various such embodiments, a plurality of the standard are different. In various such embodiments, the gaming system is further configured to cause an entry payment for the play of the selected personal tournament to be paid from credits in a credit meter of the electronic gaming machine. In various such embodiments, the gaming system is further configured to cause an entry payment for the play of the selected personal tournament to be paid from funds in an electronic player funds account of the player. In various such embodiments, the gaming system is further configured to cause an entry payment for the play of the selected personal tournament to be paid via points in a player tracking account of the player.

It should further be appreciated from the above, that various embodiments of the present disclosure provide a gaming system including a personal tournament controller comprising a processor and a memory device storing a plurality of instructions, that when executed by the processor, cause the processor to: (1) cause a display, by a display device of an electronic gaming machine, of indications of a plurality of different personal tournaments, wherein each personal tournament comprises a different type of standard, and wherein each personal tournament is not against any other competitors, players, or electronic gaming machines, (2) cause a display, by the display device of the electronic gaming machine, of an indication of a player selected one of the personal tournaments and the standard of the selected personal tournament, (3) cause a display, by the display device of the electronic gaming machine, of a play of the selected personal tournament comprising a plurality of plays of a tournament game of the selected personal tournament, (4) cause a display, by the display device of the electronic gaming machine, of an indication of the standard for the play of the selected personal tournament being achieved or exceeded, and (5) cause a display, by the display device of the electronic gaming machine, of an indication of an amount for the standard for the play of the selected personal tournament being achieved or exceeded. In various such embodiments, the different personal tournament require different entry payment amounts based on the respective different standards, and wherein the plurality of instructions, when executed by the processor, cause the processor to cause an entry payment for the play of the selected personal tournament to be paid from credits in a credit meter of the electronic gaming machine. In various such embodiments, the different personal tournament require different entry payment amounts based on the respective different standards, and wherein the plurality of instructions, when executed by the processor, cause the processor to cause an entry payment for the play of the selected personal tournament to be paid from funds in an electronic player funds account of the player. In various such embodiments, the different personal tournament require different entry payment amounts based on the respective different standards, and the gaming system is configured to cause the processor to cause an entry payment for the play of the selected personal tournament to be paid via points in a player tracking account of the player.

It should be appreciated that the present disclosure provides an improvement in gaming technology, in part, by utilization of a personal tournament controller that enables existing gaming systems to be retrofit to provide personal tournaments where players do not play against other players.

It should be appreciated that the present disclosure provides an improvement in gaming technology, in part, by providing personal tournament using standards (and in certain cases interim standards).

It should also be appreciated that in different embodiments, one or more of any determination disclosed herein, is/are predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the gaming system, determined independent of a random determination at the gaming system, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations disclosed herein, determined independent of any other determination disclosed herein or determined based on any other suitable method or criteria.

Gaming Systems

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more servers; (b) one or more electronic gaming machines such as those located on a casino floor; and/or (c) one or more personal gaming devices. Thus, in various embodiments, the gaming system of the present disclosure includes: (a) one or more electronic gaming machines in combination with one or more servers; (b) one or more personal gaming devices in combination with one or more servers; (c) one or more personal gaming devices in combination with one or more electronic gaming machines; (d) one or more personal gaming devices, one or more electronic gaming machines, and one or more servers in combination with one another; (e) a single electronic gaming machine; (f) a plurality of electronic gaming machines in combination with one another; (g) a single personal gaming device; (h) a plurality of personal gaming devices in combination with one another; (i) a single server; and/or (j) a plurality of servers in combination with one another. For brevity and clarity and unless specifically stated otherwise, "EGM" as used herein represents one EGM or a plurality of EGMs, "personal gaming device" as used herein represents one personal gaming device or a plurality of personal gaming devices, and "server" as used herein represents one server or a plurality of servers.

As noted above, in various embodiments, the gaming system includes an EGM (or personal gaming device) in combination with a server. In such embodiments, the EGM (or personal gaming device) is configured to communicate with the server through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a server through a data network.

In certain embodiments in which the gaming system includes an EGM (or personal gaming device) in combination with a server, the server is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the server. The at least one processor of that EGM (or personal gaming device) is configured to execute the events, messages, or commands represented by such data or signals in conjunction with the operation of the EGM (or personal gaming device). Moreover, the at least one processor of the server is configured to transmit and receive data or signals representing events, messages, commands, or any other suitable information between the server and the EGM (or personal gaming device). The at least one processor of the server is configured to execute the events, messages, or commands represented by such data or signals in conjunction with the operation of the server. One, more than one, or each of the functions of the server may be performed by the at least one processor of the EGM (or personal gaming device). Further, one, more than one, or each of the functions of the at least one processor of the EGM (or personal gaming device) may be performed by the at least one processor of the server.

In certain such embodiments, computerized instructions for controlling any games (such as any primary or base games and/or any secondary or bonus games) displayed by the EGM (or personal gaming device) are executed by the server. In such "thin client" embodiments, the server remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the server to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a server, computerized instructions for controlling any primary or base games displayed by the EGM (or personal gaming device) are communicated from the server to the EGM (or personal gaming device) in a thick client configuration, and computerized instructions for controlling any secondary or bonus games or other functions displayed by the EGM (or personal gaming device) are executed by the server in a thin client configuration.

In certain embodiments in which the gaming system includes: (a) an EGM (or personal gaming device) configured to communicate with a server through a data network; and/or (b) a plurality of EGMs (or personal gaming devices) configured to communicate with one another through a data network, the data network is a local area network (LAN) in which the EGMs (or personal gaming devices) are located substantially proximate to one another and/or the server. In one example, the EGMs (or personal gaming devices) and the server are located in a gaming establishment or a portion of a gaming establishment.

In other embodiments in which the gaming system includes: (a) an EGM (or personal gaming device) configured to communicate with a server through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the server. For example, one or more of the EGMs (or personal gaming devices) are located: (a) in an area of a gaming establishment different from an area of the gaming establishment in which the server is located; or (b) in a gaming establishment different from the gaming establishment in which the server is located. In another example, the server is not located within a gaming establishment in which the EGMs (or personal gaming devices) are located. In certain embodiments in which the data network is a WAN, the gaming system includes a server and an EGM (or personal gaming device) each located in a different gaming establishment in a same geographic area, such as a same city or a same state. Gaming systems in which the data network is a WAN are substantially identical to gaming systems in which the data network is a LAN, though the quantity of EGMs (or personal gaming devices) in such gaming systems may vary relative to one another.

In further embodiments in which the gaming system includes: (a) an EGM (or personal gaming device) configured to communicate with a server through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the server identifies a player before enabling that player to place any wagers on any plays of any wagering games. In one example, the server identifies the player by requiring a player account of the player to be logged into via an input of a unique username and password combination assigned to the player. The server may, however, identify the player in any other suitable manner, such as by validating a player tracking identification number associated with the player; by reading a player tracking card or other smart card inserted into a card reader (as described below); by validating a unique player identification number associated with the player by the server; or by identifying the EGM (or personal gaming device), such as by identifying the MAC address or the IP address of the Internet facilitator. In various embodiments, once the server identifies the player, the server enables placement of one or more wagers on one or more plays of one or more primary or base games and/or one or more secondary or bonus games, and displays those plays via the Internet browser of the EGM (or personal gaming device).

The server and the EGM (or personal gaming device) are configured to connect to the data network or remote communications link in any suitable manner. In various embodiments, such a connection is accomplished via a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

Figure 14:
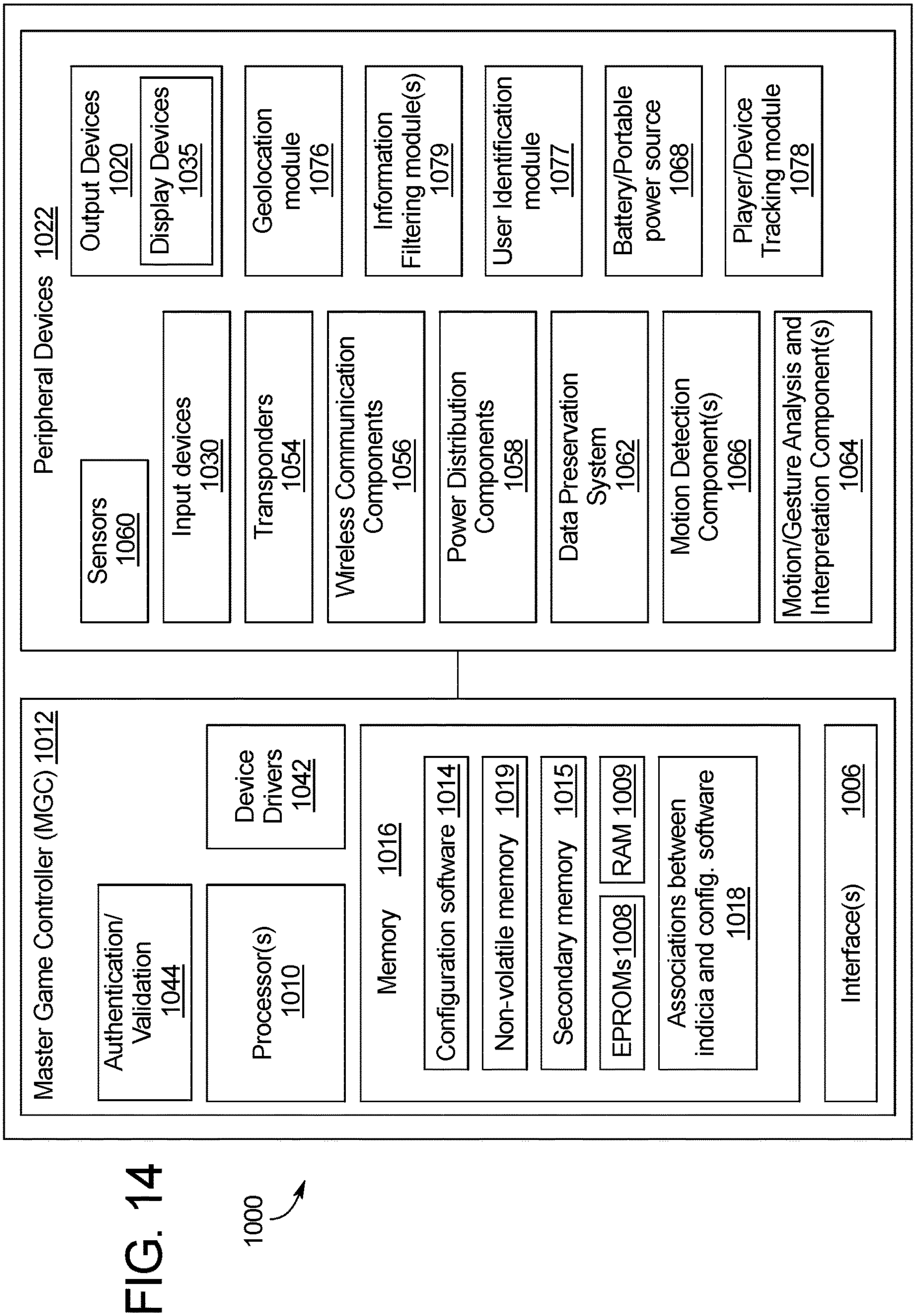
FIG. 14 is a schematic block diagram of one embodiment of an electronic configuration of an example gaming machine of a gaming system of the present disclosure.
Figure 15A:
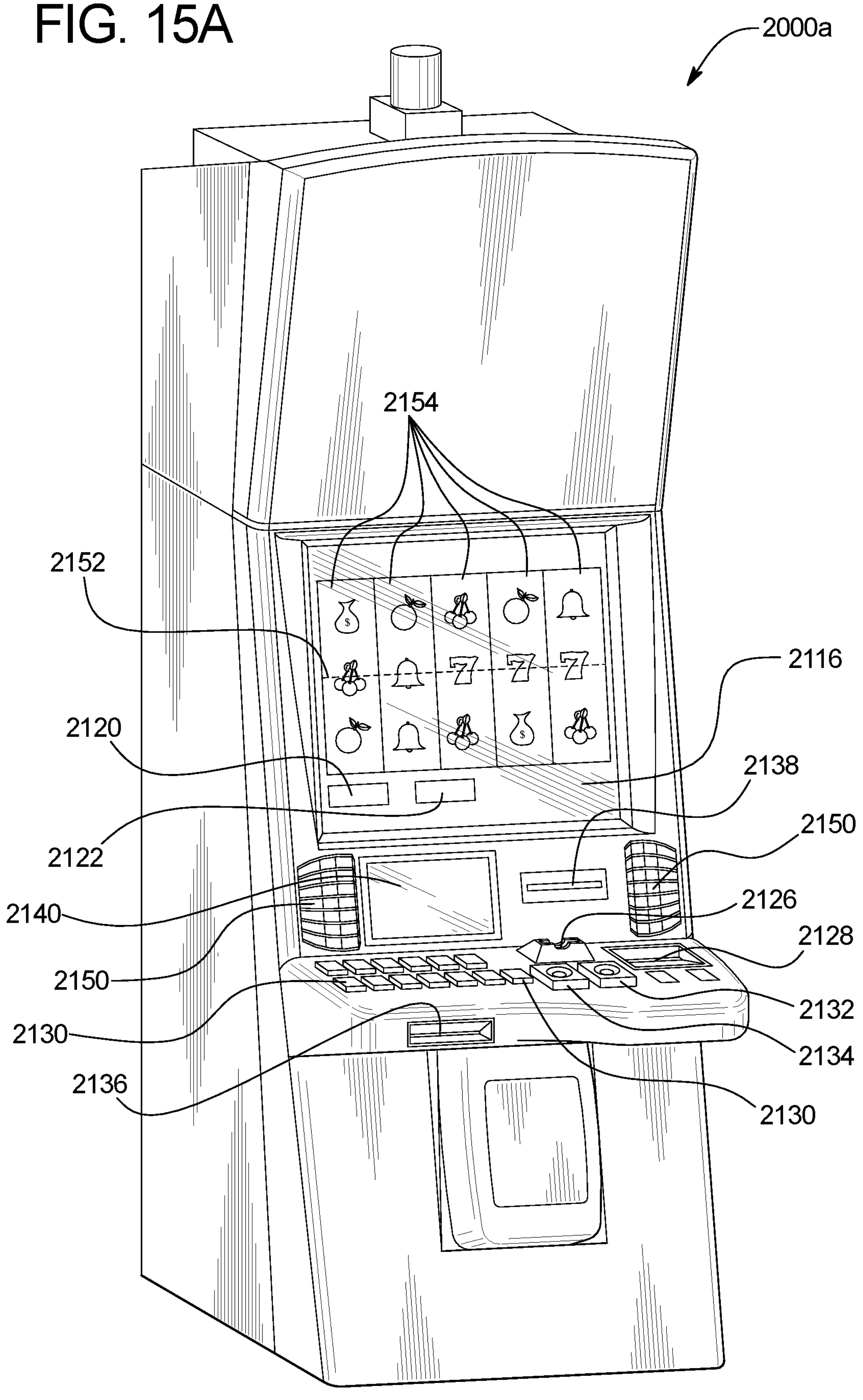
FIGS. 15A and 15B are perspective views of example alternative embodiments of the gaming machines of the gaming system of the present disclosure.
Figure 15B:
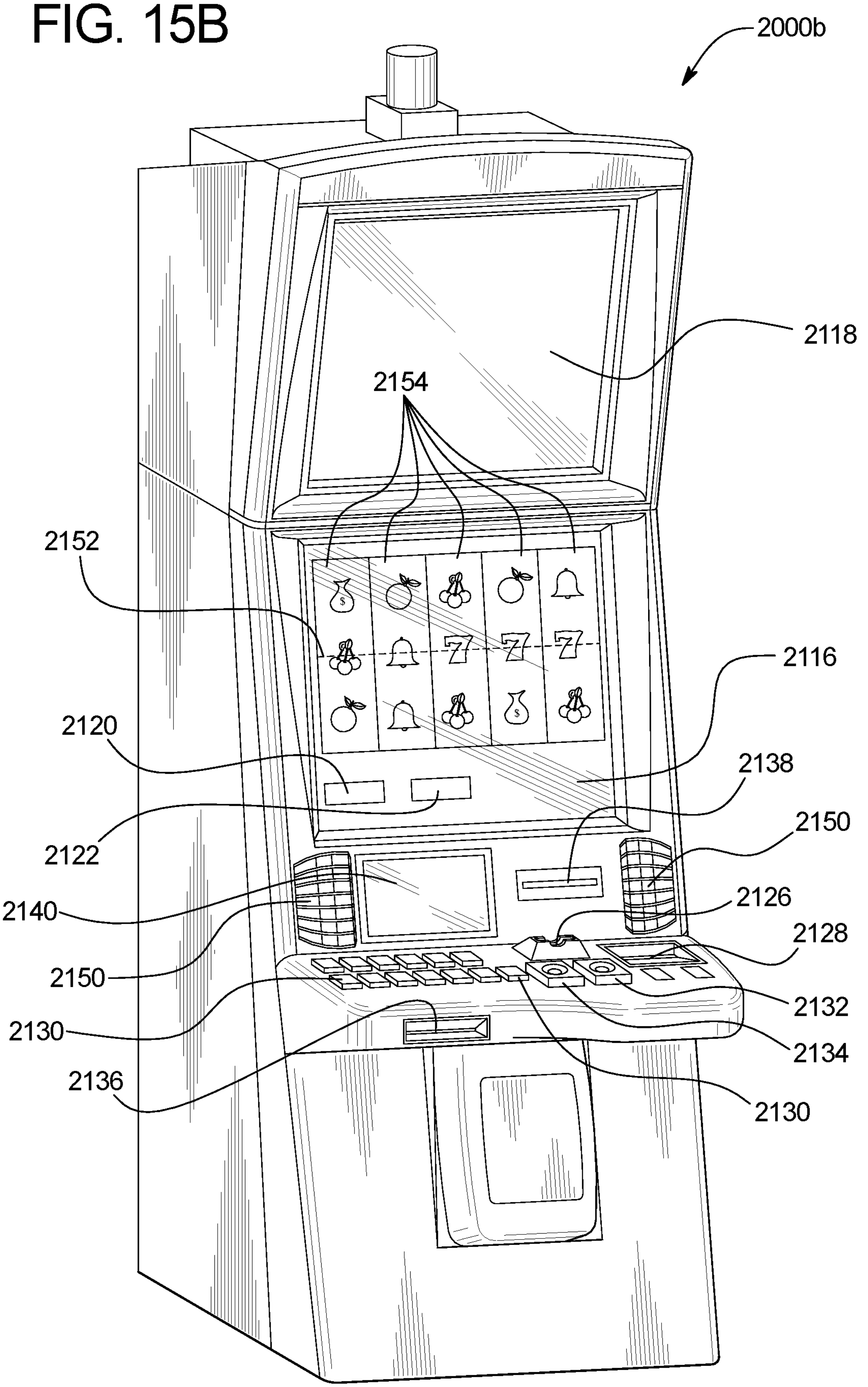
Figure 15C:
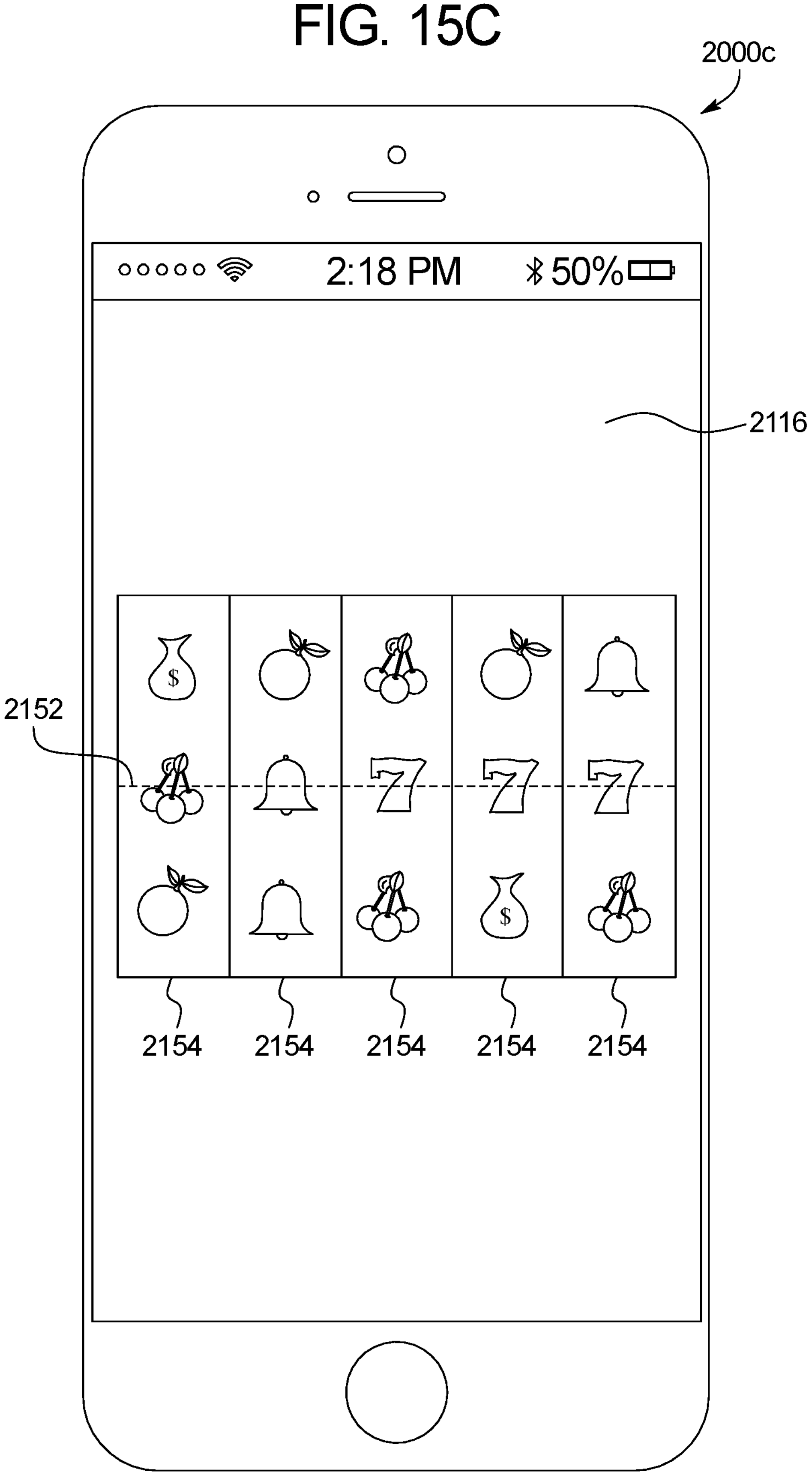
FIG. 15C is a front view of an example personal gaming device of the gaming system of the present disclosure.

FIG. 14 is a block diagram of an example EGM 1000 and FIGS. 15A and 15B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices (such as personal gaming device 2000*c* of FIG. 15C) may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM of the present disclosure. In certain embodiments, the at least one memory device 1016 resides within the housing of the EGM (described below), while in other embodiments at least one component of the at least one memory device 1016 resides outside of the housing of the EGM. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 15A includes a central display device 2116, a player tracking display 2140, a credit display 2120, and a bet display 2122. The example EGM 2000*b* illustrated in FIG. 15B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 15A and 15B each include a ticket printer and dispenser 2136.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 15A and 15B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 15A and 15B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 15A and 15B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 15A and 15B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 15A and 15B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 15A and 15B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, such as the example EGMs 2000*a* and 2000*b* illustrated in FIGS. 15A and 15B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 15A and 15B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a server and a changeable EGM, the at least one memory device of the server stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the server is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the server to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards.

In certain embodiments in which the gaming system includes a server and an EGM, the EGM is configured to communicate with the server for monitoring purposes only. In such embodiments, the EGM determines the game outcome(s) and/or award(s) to be provided in any of the manners described above, and the server monitors the activities and events occurring on the EGM. In one such embodiment, the gaming system includes a real-time or online accounting and gaming information system configured to communicate with the server. In this embodiment, the accounting and gaming information system includes: (a) a player database configured to store player profiles, (b) a player tracking module configured to track players (as described below), and (c) a credit system configured to provide automated transactions.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM **2000*b* shown in FIG. 15B includes a payline 2152 and a plurality of reels 2154**. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award.

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, which is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments' entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device.

In various embodiments, the gaming system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique username and password combination, providing an input to a biometric sensor (e.g., a fingerprint sensor, a retinal sensor, a voice sensor, or a facial-recognition sensor), or providing any other suitable information.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer, by initiating creation of a paper check that is mailed to the player, or by initiating printing of a voucher at a kiosk in a gaming establishment.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines or within the boundaries of a gaming establishment). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the gaming system includes a geo-fence system that enables tethered game play within a particular geographic area but not outside of that geographic area.

In certain embodiments, the gaming system is configured to communicate with a social network server that hosts or partially hosts a social networking website via a data network (such as the Internet) to integrate a player's gaming experience with the player's social networking account. This enables the gaming system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming system to receive certain information from the social network server, such as the player's likes or dislikes or the player's list of connections. In certain embodiments, the gaming system enables the player to link the player's player account to the player's social networking account(s). This enables the gaming system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the gaming system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming system sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming system enables the player to recommend a game to the player's connections by posting a recommendation to the player's wall (or other suitable area) of the social networking website.

Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication-EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/see (Read) and/or at least 38.0 Mbytes/see (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present.

It should be appreciated that the terminology used herein is for the purpose of describing particular aspects only and is not intended to be limiting of the disclosure. For example, the singular forms "a," "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention claimed is:

1. A gaming system comprising:

a personal tournament controller, personal tournament controller comprising a processor and a memory device storing a plurality of instructions, that when executed by the processor, cause the processor to:

cause a display, by a display device of an electronic gaming machine, of an indication of personal tournament, wherein the personal tournament comprises a standard, wherein the personal tournament comprises plays of a tournament game, wherein standard cannot be achieved in a single play of the tournament game, wherein the standard can be achieved in a plurality of the plays of the tournament game, and wherein the personal tournament is not against any other competitors, players, or electronic gaming machines, cause a display, by the display device of the electronic gaming machine, of an indication of the standard of the personal tournament, cause a display, by the display device of the electronic gaming machine, of a play of the personal tournament comprising the plays of the tournament game of the personal tournament, cause a display, by the display device of the electronic gaming machine, of an indication that the standard for the play of the personal tournament is achieved or exceeded, and cause a display, by the display device of the electronic gaming machine, of an indication of an amount based on the standard for the play of the personal tournament being achieved or exceeded, wherein the standard is different than the amount.

2. The gaming system of claim 1, wherein the plurality of instructions, when executed by the processor, cause the processor to cause a service window displayed by the display device of the electronic gaming machine to display the indication of personal tournament, the indication of the standard of the personal tournament, the play of the personal tournament, the indication of the standard for the play of the personal tournament being achieved or exceeded, and the indication of the amount for the standard for the play of the personal tournament being achieved or exceeded.

3. The gaming system of claim 1, wherein the standard for the play of the personal tournament comprises one of: a predetermined score, a predetermined quantity of credits won, a gross amount won, a net amount won, a quantity of winning tournament game plays, and an accumulation of certain quantity of one or more elements.

4. The gaming system of claim 1, wherein the selected personal tournament comprises an interim standard, and the plurality of instructions, when executed by the processor, cause the processor to cause a display, by the display device of the electronic gaming machine, of an indication of the interim standard, an indication of the interim standard for the play of the personal tournament being achieved, and the indication of a benefit from the interim being achieved.

5. The gaming system of claim 4, wherein the interim standard is part of the standard for the personal tournament.

6. The gaming system of claim 4, wherein the interim standard is part of the standard is one of based directly on the standard for the personal tournament and based indirectly on the standard for the personal tournament.

7. The gaming system of claim 4, wherein the interim standard is completely separate from and independent of the standard for the personal tournament.

8. The gaming system of claim 1, wherein the plurality of instructions, when executed by the processor, cause the processor to cause an entry payment for the play of the personal tournament to be paid from credits in a credit meter of the electronic gaming machine.

9. The gaming system of claim 1, wherein the plurality of instructions, when executed by the processor, cause the processor to cause an entry payment for the play of the personal tournament to be paid from funds in an electronic player funds account of the player.

10. The gaming system of claim 1, wherein the plurality of instructions, when executed by the processor, cause the processor to cause an entry payment for the play of the personal tournament to be paid via points in a player tracking account of the player.

11. A gaming system comprising:

a personal tournament controller comprising a processor and a memory device storing a plurality of instructions, that when executed by the processor, cause the processor to:

cause a display, by a display device of an electronic gaming machine, of indications of a plurality of different personal tournaments, wherein each different personal tournament comprises a different standard, wherein each different personal tournament comprises plays of a different tournament game, wherein for each different personal tournament: (i) the standard of that personal tournament cannot be achieved in a single play of the tournament game of the tournament, and (ii) the standard of that personal tournament can be achieved in a plurality of the plays of the tournament game of that personal tournament, and wherein each different personal tournament is not against any other competitors, players, or electronic gaming machines, cause a display, by the display device of the electronic gaming machine, of an indication of a player selected one of the different personal tournaments and the standard of the selected personal tournament, cause a display, by the display device of the electronic gaming machine, of a play of the selected personal tournament comprising the plays of the tournament game of the selected personal tournament, cause a display, by the display device of the electronic gaming machine, of an indication of the standard for the play of the selected personal tournament being achieved or exceeded, and cause a display, by the display device of the electronic gaming machine, of an indication of an amount for the standard for the play of the selected personal tournament being achieved or exceeded, wherein the standard is different than the amount.

12. The gaming system of claim 11, wherein the plurality of instructions, when executed by the processor, cause the processor to cause a service window displayed by the display device of the electronic gaming machine to display the indication of selected personal tournament, the indication of the standard of the selected personal tournament, the play of the selected personal tournament, the indication of the standard for the play of the selected personal tournament being achieved or exceeded, and the indication of the amount for the standard for the play of the selected personal tournament being achieved or exceeded.

13. The gaming system of claim 11, wherein the plurality of instructions, when executed by the processor, cause the processor to cause an entry payment for the play of the selected personal tournament to be paid from credits in a credit meter of the electronic gaming machine.

14. The gaming system of claim 11, wherein the plurality of instructions, when executed by the processor, cause the processor to cause an entry payment for the play of the selected personal tournament to be paid from funds in an electronic player funds account of the player.

15. The gaming system of claim 11, wherein the plurality of instructions, when executed by the processor, cause the processor to cause an entry payment for the play of the selected personal tournament to be paid via points in a player tracking account of the player.

16. A gaming system comprising:

a personal tournament controller comprising a processor and a memory device storing a plurality of instructions, that when executed by the processor, cause the processor to:

cause a display, by a display device of an electronic gaming machine, of indications of a plurality of different personal tournaments, wherein each different personal tournament comprises a different type of standard, wherein each different personal tournament comprises plays of a respective tournament game, wherein for each different personal tournament: (i) the standard of that personal tournament cannot be achieved in a single play of the tournament game of that personal tournament, and (ii) the standard of that personal tournament can be achieved in a plurality of the plays of the tournament game of that personal tournament, and wherein each personal tournament is not against any other competitors, players, or electronic gaming machines, cause a display, by the display device of the electronic gaming machine, of an indication of a player selected one of the personal tournaments and the standard of the selected personal tournament, cause a display, by the display device of the electronic gaming machine, of a play of the selected personal tournament comprising the plays of the tournament game of the selected personal tournament, cause a display, by the display device of the electronic gaming machine, of an indication of the standard for the play of the selected personal tournament being achieved or exceeded, and cause a display, by the display device of the electronic gaming machine, of an indication of an amount for the standard for the play of the selected personal tournament being achieved or exceeded, wherein the standard is different than the amount.

17. The gaming system of claim 16, wherein the different personal tournament require different entry payment amounts based on the respective different standards, and wherein the plurality of instructions, when executed by the processor, cause the processor to cause an entry payment for the play of the selected personal tournament to be paid from credits in a credit meter of the electronic gaming machine.

18. The gaming system of claim 16, wherein the different personal tournament require different entry payment amounts based on the respective different standards, and wherein the plurality of instructions, when executed by the processor, cause the processor to cause an entry payment for the play of the selected personal tournament to be paid from funds in an electronic player funds account of the player.

19. The gaming system of claim 16, wherein the different personal tournament require different entry payment amounts based on the respective different standards, and wherein the plurality of instructions, when executed by the processor, cause the processor to cause an entry payment for the play of the selected personal tournament to be paid via points in a player tracking account of the player.

* * * * *